United States Patent
Wada et al.

(10) Patent No.: US 10,154,178 B2
(45) Date of Patent: Dec. 11, 2018

(54) IMAGING APPARATUS WITH LIGHT SHIELDING PLATES FOR BLOCKING INCIDENT LIGHT ON A LENS

(71) Applicant: PANASONIC INTELLECTUAL PROPERTY MANAGEMENT CO., LTD., Osaka (JP)

(72) Inventors: Jyouji Wada, Kanagwa (JP); Tatsuo Tanno, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 15/292,771

(22) Filed: Oct. 13, 2016

(65) Prior Publication Data
US 2017/0111554 A1   Apr. 20, 2017

(30) Foreign Application Priority Data

Oct. 15, 2015  (JP) .................................. 2015-203924
Aug. 3, 2016   (JP) .................................. 2016-152723

(51) Int. Cl.
H04N 5/225 (2006.01)
H04N 7/18 (2006.01)

(52) U.S. Cl.
CPC ......... *H04N 5/2252* (2013.01); *H04N 5/2254* (2013.01); *H04N 7/183* (2013.01)

(58) Field of Classification Search
CPC ..... H04N 5/2252; H04N 5/2254; H04N 7/183
USPC ....................................................... 348/151
See application file for complete search history.

(56) References Cited

U.S. PATENT DOCUMENTS

| | | | | |
|---|---|---|---|---|
| 6,992,723 | B1 * | 1/2006 | Wulf ................ | G08B 13/19619 348/144 |
| 9,716,816 | B2 * | 7/2017 | Urano ................. | H04N 5/2254 |
| 9,948,858 | B2 * | 4/2018 | Laroia .................... | G02B 27/58 |
| 9,973,735 | B2 * | 5/2018 | Wada ................ | G08B 13/1963 |
| 2002/0140850 | A1 * | 10/2002 | Toste ............... | G08B 13/19619 348/375 |
| 2003/0185556 | A1 * | 10/2003 | Stiepel ................... | F16M 11/10 396/427 |

(Continued)

FOREIGN PATENT DOCUMENTS

| JP | 61-119139 U | 7/1986 |
|---|---|---|
| JP | 2-136237 U | 11/1990 |

(Continued)

OTHER PUBLICATIONS

Qin et al, On demand sharing of a high resolution panoramic video from networked robotic cameras (Year: 2007).*

*Primary Examiner* — Shan E Elahi
(74) *Attorney, Agent, or Firm* — Greenblum & Bernstein, P.L.C.

(57) ABSTRACT

An imaging apparatus includes: a camera portion; a lens cover that includes a light receiving hole and covers the camera portion; a ring gear that is attached to the lens cover while surrounding the light receiving hole and is rotatable using the center of concentric circles formed by the ring gear; and a pair of light shielding plates that are attached to a cover outer surface, each of the pair of light shielding plates including an inclined rack, and opening and closing the light receiving hole with the inclined racks meshing with opposite ends in a radial direction of the ring gear.

13 Claims, 26 Drawing Sheets

(56) References Cited

U.S. PATENT DOCUMENTS

| | | | |
|---|---|---|---|
| 2007/0041726 A1* | 2/2007 | Lee | G03B 17/02 |
| | | | 396/427 |
| 2007/0053681 A1* | 3/2007 | Arbuckle | F16M 11/10 |
| | | | 396/427 |
| 2008/0056708 A1* | 3/2008 | Kim | G03B 37/06 |
| | | | 396/427 |
| 2008/0231699 A1* | 9/2008 | Konishi | G03B 37/02 |
| | | | 348/143 |
| 2012/0045197 A1* | 2/2012 | Jones | G03B 17/02 |
| | | | 396/427 |
| 2013/0040769 A1* | 2/2013 | Kadokawa | F16H 9/18 |
| | | | 474/8 |
| 2013/0169805 A1* | 7/2013 | Park | G08B 13/19619 |
| | | | 348/143 |
| 2013/0223834 A1 | 8/2013 | Jikihara et al. | |
| 2014/0248045 A1 | 9/2014 | Wada et al. | |
| 2014/0333767 A1 | 11/2014 | Jikihara et al. | |
| 2015/0002826 A1 | 1/2015 | Hashimoto et al. | |
| 2015/0268534 A1 | 9/2015 | Jikihara et al. | |
| 2016/0255255 A1* | 9/2016 | Urano | H04N 5/2254 |
| | | | 348/164 |

FOREIGN PATENT DOCUMENTS

| | | |
|---|---|---|
| JP | 3-089428 U | 9/1991 |
| JP | 2012-103452 | 5/2012 |
| JP | 2013-222187 A | 10/2013 |
| JP | 2014-056155 A | 3/2014 |
| JP | 2015-011053 A | 1/2015 |
| JP | 2015-087737 A | 5/2015 |

\* cited by examiner

IMAGING APPARATUS WITH LIGHT SHIELDING PLATES FOR BLOCKING INCIDENT LIGHT ON A LENS

BACKGROUND

1. Technical Field

The present disclosure relates to an imaging apparatus which includes light shielding plates that block light incident on a lens.

2. Description of the Related Art

A dome type camera is used as, for example, a surveillance camera. In a dome type camera, a camera lens is covered by a dome cover and the dome cover protects the camera lens (for example, refer to Japanese Patent Unexamined Publication No. 2012-103452).

As a surveillance camera, a camera which is provided with a pair of barriers for opening and closing of a front surface of the camera is known. The pair of barriers are provided for the purpose of allowing a person to clearly be aware that the camera is in a non-imaging state and improving a privacy-oriented function or the purpose of protecting an imaging lens.

In a configuration described in Japanese Patent Unexamined Publication No. 2012-103452, to move the pair of barriers (hereinafter, referred to as "light shielding plates") in different directions, it is generally necessary to provide multiple staged gears and a direction reversing gear and to drive (open and close) each light shielding plate by transmitting a torque of a motor to each light shielding plate via the plurality of gears. Therefore, the imaging apparatus needs to include a complicated mechanism such as a direction reversing mechanism, and components of the mechanism (gear unit or the like) are concentrated on one side of the vicinity of the lens, which results in a complicated structure.

The present invention has been proposed in such a circumstance, and an object thereof is to provide an imaging apparatus which has a simple configuration and is capable of an opening and closing operation in which a pair of light shielding plates are moved in different directions.

SUMMARY

According to the present disclosure, there is provided an imaging apparatus including: a camera portion that includes a lens; a cover that includes a light receiving hole opening in front of the lens and covers the camera portion; a ring gear that is attached to the cover while surrounding the light receiving hole and being concentric with the light receiving hole, includes outer circumferential teeth, and is rotatable using the center of concentric circles formed by the ring gear and the light receiving hole as a rotation center; and a pair of light shielding plates that are attached to a cover outer surface, which is on an opposite side of the camera portion, with an optical axis interposed therebetween such that the pair of light shielding plates can approach and be separated from each other freely, each of the pair of light shielding plates including a rack which extends along a direction of the approach and separation, and opening and closing the light receiving hole with the racks meshing with opposite ends in a radial direction of the ring gear.

According to the present disclosure, there is provided an imaging apparatus which has a simple configuration and is capable of an opening and closing operation in which a pair of light shielding plates are moved in different directions.

DETAILED DESCRIPTION OF PREFERRED EMBODIMENTS

Hereinafter, with reference to drawings appropriately, details of each specific exemplary embodiment of an imaging apparatus according to the present disclosure will be described. Meanwhile, an excessively detailed description may be omitted. For example, known matters may be not described in detail and the substantially same components may not be repeatedly described. This is for preventing unnecessary prolixity in the description below and is for allowing the skilled in the art to easily understand the disclosure. The attached drawings and the below description are provided to allow those skilled in the art to easily understand the disclosure, and are not intended to limit a subject described in claims. In the following exemplary embodiments, surveillance camera 11 is described as an example of the imaging apparatus according to the present disclosure.

First Exemplary Embodiment

Figure 1:
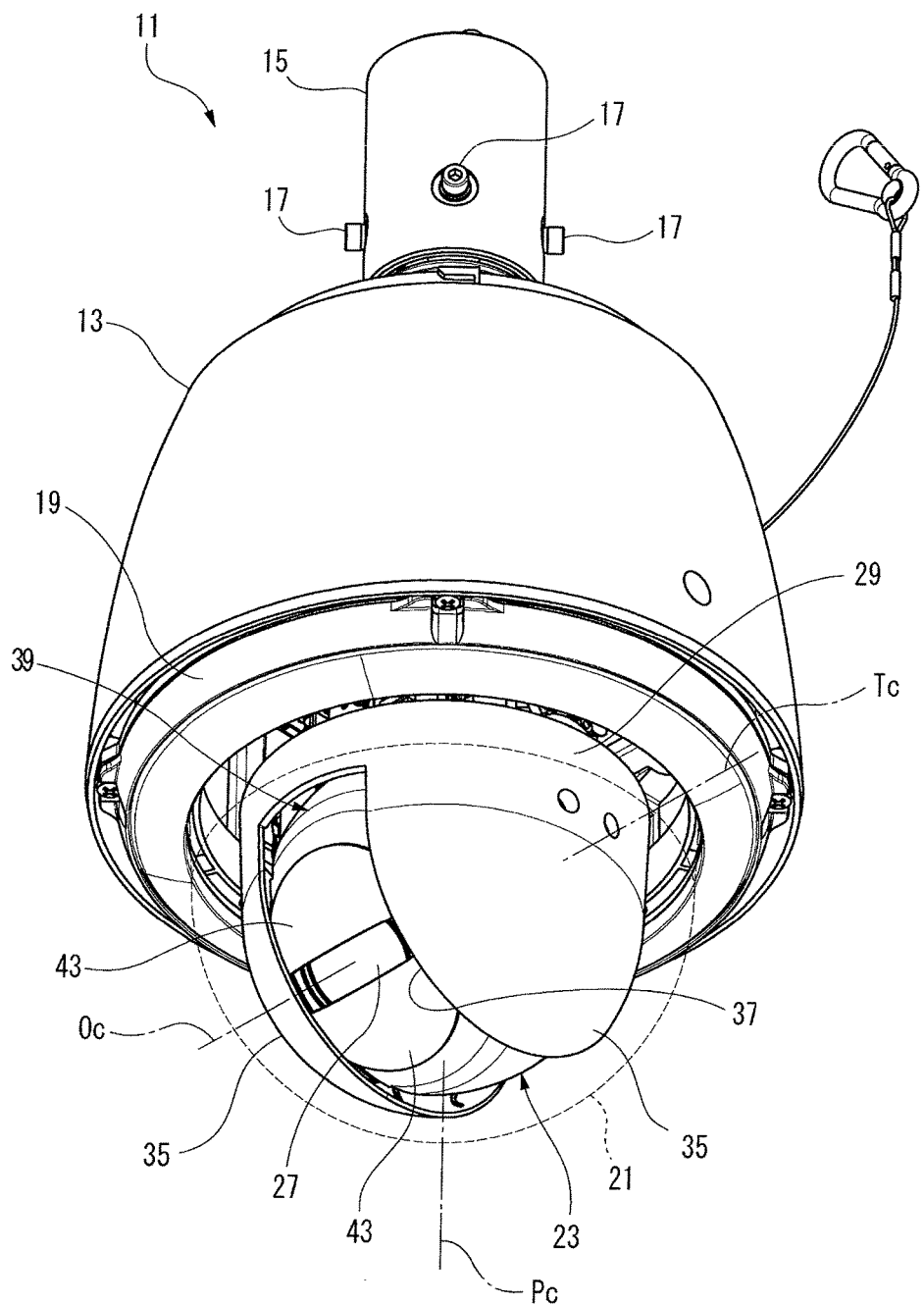
FIG. 1 is a perspective view illustrating an appearance of a surveillance camera according to each exemplary embodiment.

FIG. 1 is a perspective view illustrating an appearance of surveillance camera 11 according to each exemplary embodiment. Surveillance camera 11 according to a first exemplary embodiment includes cylindrical outer cover 13 which has a conical surface. On an upper end of outer cover 13, attachment cylinder 15 is provided which is fixed to an attachment target object such as a pole or a ceiling. Surveillance camera 11 is attached to a pole or a ceiling being suspended from the pole or the ceiling with attachment cylinder 15 positioned on the upper side in a vertical direction. Outer cover 13 functions as, for example, a rain shield. A plurality of fixing bolt 17 for fixing an inserted pole or the like are screwed on attachment cylinder 15 at equal intervals in a circumferential direction. Attachment cylinder 15 communicates with the inside of outer cover 13. Into outer cover 13, a power line and a signal line which pass through the pole or the like are introduced via attachment cylinder 15.

On a bottom surface of outer cover 13, a circular opening is formed. In the circular opening, annular ring cover 19 is detachably provided. Through an inner hole of ring cover 19, a semi-spherical portion of dome cover 21 which can be formed using a transparent resin material is suspended. Dome cover 21 includes a semi-spherical outer shell and a cylinder which is connected to a circumferential edge of an opening of the semi-spherical outer shell and has the same diameter as the opening. The cylinder includes a flange (not illustrated) fixed to ring cover 19 on the opposite side of the semi-spherical outer shell. Dome cover 21 is fixed to ring cover 19 with the flange disposed between ring cover 19 and outer cover 13.

Dome cover 21 is formed using a resin material with excellent formability and transparency as a base material. Examples of the resin material include an organic resin material and an inorganic resin material. In the first exemplary embodiment, the semi-spherical outer shell is formed using an organic resin material such as polycarbonate as a base material. Polycarbonate is suitable for the base material since it is hard and is resistant to impact. In addition, a resin with favorable transparency such as acryl may also be used.

The inner space of dome cover 21 serves as a camera accommodation space. In the camera accommodation space, camera unit 23 is disposed. Camera unit 23 is rotatable around pan rotation center Pc along a vertical direction and tilt rotation center Tc which is orthogonal to pan rotation center Pc. Camera unit 23 includes camera portion 25 (refer to FIG. 4). Camera portion 25 which is an example of a camera portion includes lens 27. Camera unit 23 is fixed to circular dish-shaped pan base 29. Pan base 29 is supported by a base (not illustrated) in outer cover 13 so as to freely pan rotation. Pan base 29 is provided with lens frame 31 (refer to FIG. 4). Lens frame 31 rotates in a pan direction (in other words, a horizontal direction orthogonal to a suspension direction of surveillance camera 11) together with pan base 29. Lens frame 31 is supported by pan base 29 so as to freely tilt rotation around tilt rotation center Tc using tilt shaft 33 (refer to FIG. 4).

A pair of unit outside plates 35 are suspended from the opposite ends in a radial direction of pan base 29 being separated from each other. A space between the pair of unit outside plates 35 serves as arch-shaped imaging opening 37 with uniform width which extends along a spherical surface from one end in a radial direction of the spherical surface to the other end in a radial direction of the spherical surface. Inside imaging opening 37, lens 27 of camera portion 25 is disposed. Therefore, tilting of camera portion 25 can move optical axis Oc along imaging opening 37 from one end side in a radial direction of the spherical surface to the other end side in a radial direction of the spherical surface.

Lens cover assembly 39 is disposed between imaging opening 37 and camera portion 25. Lens cover assembly 39 includes lens cover 41 which is a cover, and a pair of light shielding plates 43. Lens cover assembly 39 is fixed to lens frame 31 and rotatably tilts integrally with camera portion 25.

Figure 2:
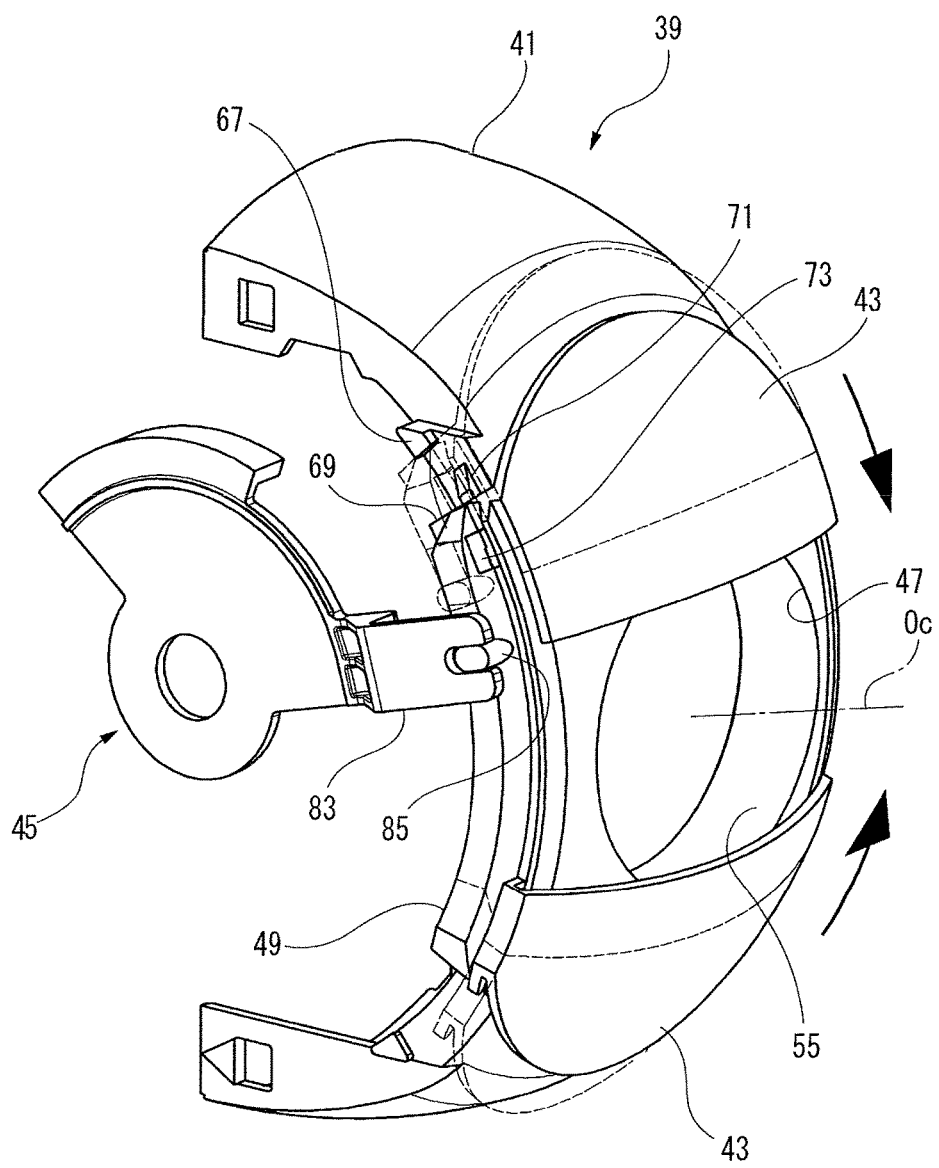
FIG. 2 is a perspective view illustrating a main portion of a lens cover with a light shielding plate attached thereto and an opening and closing lever.

FIG. 2 is a perspective view illustrating a main portion of lens cover 41 with light shielding plate 43 attached thereto and opening and closing lever 45. Lens cover 41 is formed to have a rectangular curved plate shape which is obtained by removing opposite sides of a semi-sphere using a pair of parallel planes interposing the center of the semi-sphere, leaving the central portion. On the central portion of lens cover 41, light receiving hole 47 is formed. Light receiving hole 47 is disposed in front of lens 27. The center of light receiving hole 47 coincides with optical axis Oc of lens 27. In the specification, "front" means a subject side. "Rear" means a side opposite to a subject with respect to camera portion 25.

In lens cover 41, the pair of light shielding plates 43 are provided to a cover outer surface or the like, which is on the opposite side of camera portion 25, with light receiving hole 47 interposed therebetween. Light shielding plate 43 is formed to have a substantially semi-circular curved plate shape (in other words, an eyelid-like shape). A closing end side of light shielding plate 43 is formed to have a radially linear shape and an opening end side of light shielding plate 43 is formed to have an arc shape.

Light shielding plate 43 includes arm 49 which is bent corresponding to the curved shape of lens cover 41. Light shielding plate 43 is attached to lens cover 41 to be slidable along the cover outer surface with arm 49 engaging with a side edge of lens cover 41. The pair of light shielding plates 43 slide in a direction of approach and separation to open or close light receiving hole 47. The pair of light shielding plates 43 are formed to have the substantially same shape. More accurately, an opposite edge portion of arm 49 of one light shielding plate 43 is engaged with arm 49 of other light shielding plate 43. The pair of light shielding plates 43 are partially different from each other in configuration. However, the difference is not the main part of the disclosure, and thus is not described in detail.

Only one of the pair of light shielding plates 43 is driven by opening and closing lever 45. In surveillance camera 11, the pair of light shielding plates 43 are open or closed by being driven by only one opening and closing lever 45 with a mechanism which will be described below. Opening and closing lever 45 is rotatably supported by tilt shaft 33.

Figure 3:
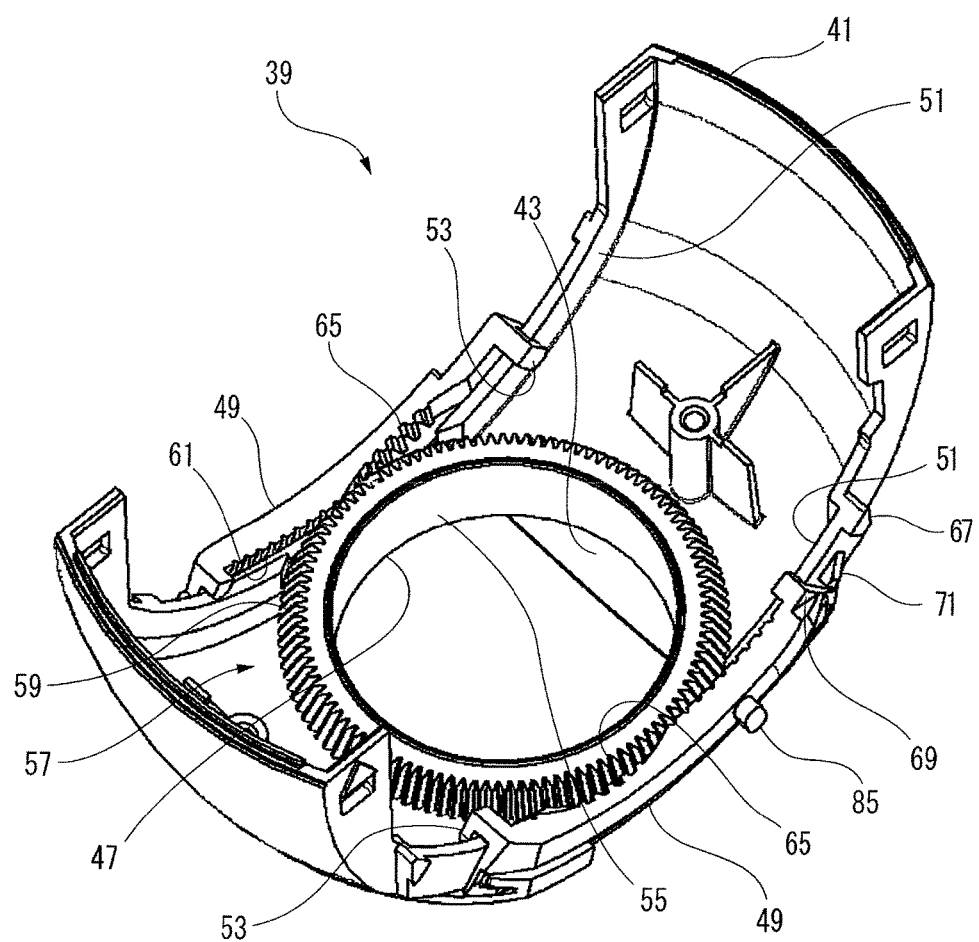
FIG. 3 is a rear view illustrating the lens cover shown in FIG. 2 as seen from a camera portion side.

FIG. 3 is a rear view illustrating lens cover 41 shown in FIG. 2 as seen from camera portion 25 side. On opposite sides of lens cover 41, side wall-shaped rails 51 are respectively provided. Rails 51 erect toward camera portion 25. On arm 49 of light shielding plate 43, pinching projection 53 which pinches rail 51 in a thickness direction is formed. Accordingly, arm 49 of light shielding plate 43 can be set along rail 51, and light shielding plate 43 is slidably attached to lens cover 41.

On a rear surface of lens cover 41 which is close to camera portion 25, cylindrical circumferential wall 55 which erects from a circumferential edge of light receiving hole 47 is provided. Onto an outer circumferential portion of circumferential wall 55, ring gear 57 is externally fitted in a rotatable manner. Ring gear 57 surrounds light receiving hole 47 and is attached to be concentric with lens cover 41. Ring gear 57 includes outer circumferential teeth and is rotatable around the center of concentric circles formed by ring gear 57 and light receiving hole 47. The outer circumferential teeth constitute a bevel gear. The bevel gear includes bevel teeth 59 which are radially arranged on a conical surface. A camera side of ring gear 57 has a small diameter and a lens cover side of ring gear 57 has a large diameter.

On arm 49, a rack which meshes with bevel teeth 59 of ring gear 57 is formed. The racks of the pair of light shielding plates 43 attached to lens cover 41 mesh with opposite ends in a radial direction of ring gear 57. Therefore, when ring gear 57 rotates, the racks slide in opposite directions (in other words, a direction of approach and separation with respect to a rotation center of ring gear 57).

As described above, the pair of light shielding plates 43 are attached to a cover outer surface, which is on an opposite side of camera portion 25, with optical axis Oc interposed therebetween such that the pair of light shielding plates 43 can approach and be separated from each other freely. Each of the pair of light shielding plates 43 includes a rack which extends along a direction of the approach and separation and is provided on arm 49. The racks of the pair of light shielding plates 43 mesh with the opposite ends in the radial direction of ring gear 57. Accordingly, the pair of light shielding plates 43 slide in the direction of the approach and separation to open and close light receiving hole 47.

Bevel teeth 59 are clamped by the rack formed on arm 49 and lens cover 41. That is, the rack is inclined rack 61 (refer to FIG. 8) which is formed on an inclined surface that is formed corresponding to the shape of the conical surface of bevel teeth 59. Inclined rack 61 covers bevel teeth 59 of ring gear 57 which is attached to lens cover 41 and clamps ring gear 57 so as to prevent ring gear 57 from being separated from lens cover 41. An inclined surface of inclined rack 61 serves as one inclined inner surface of V-groove 63 (refer to FIG. 8) which is formed on arm 49.

On arm 49, notch 65 is formed which is obtained by lowering the height of only a portion of teeth of inclined rack 61. Notch 65 releases ring gear 57 clamped by inclined rack 61. Inclined rack 61 is also provided in notch 65, and the meshing between inclined rack 61 and bevel teeth 59 is maintained. Therefore, ring gear 57 clamped by inclined rack 61 is released when notches 65 of arms 49 on the opposite sides are disposed close to the opposite ends in the radial direction of ring gear 57, which makes it possible to detach ring gear 57 from lens cover 41. Hereinafter, the position of light shielding plate 43 in such a case will be referred to as "set position". The set position is closer to the outside (opening side) than a fully-open position of light shielding plate 43 is.

As described above, notches 65 are formed on the pair of light shielding plates 43 (more specifically, on arm 49 of light shielding plate 43). Notch 65 allows a movement of ring gear 57 in a direction along the rotation center by releasing the meshing between inclined rack 61 and the bevel gear when light shielding plate 43 is in the set position which is closer to the outside than the fully-open position is.

Lens cover 41 is provided with a pair of assembly guides 67 which respectively restrict movements in a separation direction of the pair of light shielding plates 43 when the pair of light shielding plates 43 are in the set position. In light shielding plate 43, contact end 69 which is an end in a sliding direction of arm 49 comes into contact with assembly guide 67.

In addition, in lens cover 41, stopper 71 is provided on a light shielding plate closing side of each assembly guide 67. Stopper 71 has an inclined surface that contact end 69 of light shielding plate 43 which comes into contact with assembly guide 67 can slide up. Stopper 71 comes into contact with contact end 69 which have passed over the inclined surface to inhibit light shielding plate 43 from moving toward the set position beyond the fully-open position. In the first exemplary embodiment, in arm 49 of light shielding plate 43, stopper receiving hole 73 (refer to FIG. 12) is punched. Contact end 69 is a portion of an edge of stopper receiving hole 73. Stopper receiving hole 73 can receive stopper 71.

Figure 4:
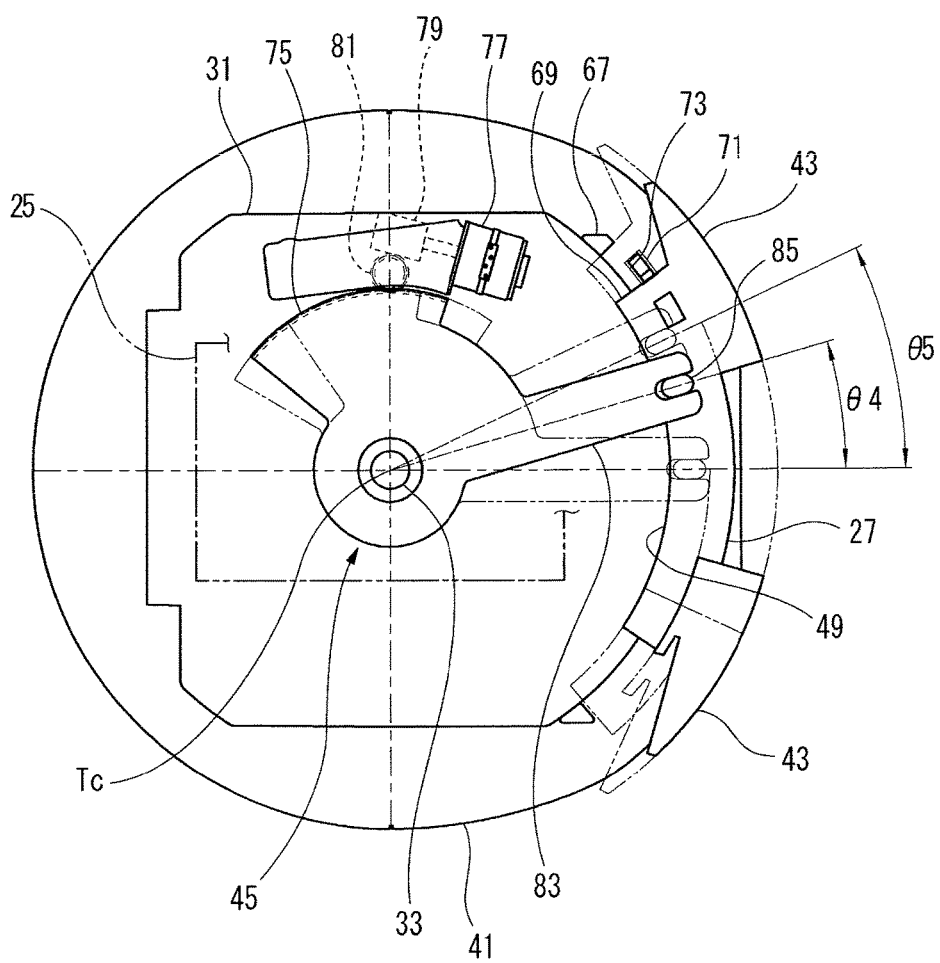
FIG. 4 is a side view illustrating an opening and closing mechanism of the light shielding plate as seen in a direction along a swing axis of the opening and closing lever.

FIG. 4 is a side view illustrating an opening and closing mechanism of light shielding plate 43 as seen in a direction along a swing axis of opening and closing lever 45. On tilt shaft 33 of lens frame 31, opening and closing lever 45 which drives one of the pair of light shielding plates 43 to open and close the pair of light shielding plates 43 is swingably supported. On opening and closing lever 45, input tooth portion 75 is which extends along a swing direction is formed. Opening and closing motor 77 is fixed to lens frame 31. Worm 79 is fixed to a driving shaft of opening and closing motor 77. Worm 79 meshes with deceleration gear 81. Deceleration gear 81 is configured as, for example, a helical gear, and meshes with input tooth portion 75 of opening and closing lever 45. On opening and closing lever 45, swing rod 83 which protrudes radially outward is formed. On a protruding tip end of swing rod 83, an engaging concave portion is formed. The engaging concave portion is engaged with engage pin 85 which protrudes from an outer surface of arm 49 of one light shielding plate 43. That is, one light shielding plate 43 is driven in an opening and closing direction via engage pin 85 that is engaged with swing rod 83 when opening and closing motor 77 is driven and opening and closing lever 45 is rotated while being decelerated by worm 79 and deceleration gear 81.

When opening and closing motor 77 is driven and opening and closing lever 45 is swing with a rotation angle of θ4 (for example, 16 degrees), the pair of light shielding plates 43 move in opposite directions, and each come into contact with stopper 71 to be open. That is, stopper 71 functions as an outer end stopper with respect to light shielding plate 43 when a rotation angle of opening and closing lever 45 is θ4. In addition, assembly guide 67 functions as a set position guide with respect to light shielding plate 43 when a rotation angle of opening and closing lever 45 is θ5.

In surveillance camera 11, when one light shielding plate 43 slides in such a manner, ring gear 57 is rotated via inclined rack 61 of one light shielding plate 43. When ring gear 57 is rotated, other light shielding plate 43 of which inclined rack 61 meshes with the opposite side in the radial direction of ring gear 57 slide in the opposite direction. Accordingly, the pair of light shielding plates 43 can slide in the opening and closing direction using one opening and closing lever 45.

Next, an assembly procedure of surveillance camera 11 will be described.

Figure 5:
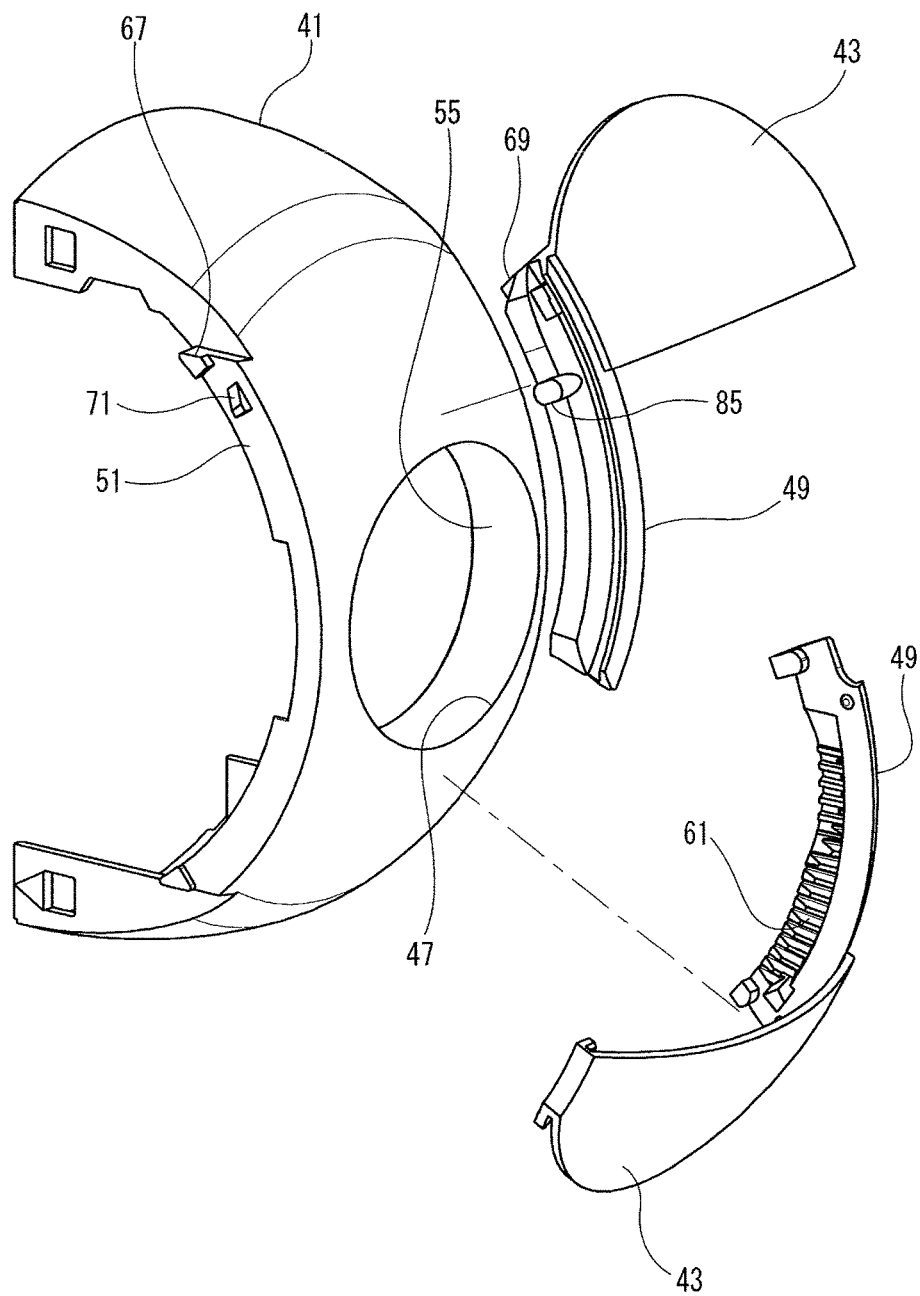
FIG. 5 is an assembly explanation diagram illustrating a state immediately before the light shielding plate is attached to the lens cover.

FIG. 5 is an assembly explanation diagram illustrating a state immediately before light shielding plate 43 is attached to lens cover 41. In an assembling process of lens cover assembly 39, first, the pair of light shielding plates 43 are attached to the cover outer surface of lens cover 41.

Figure 6:
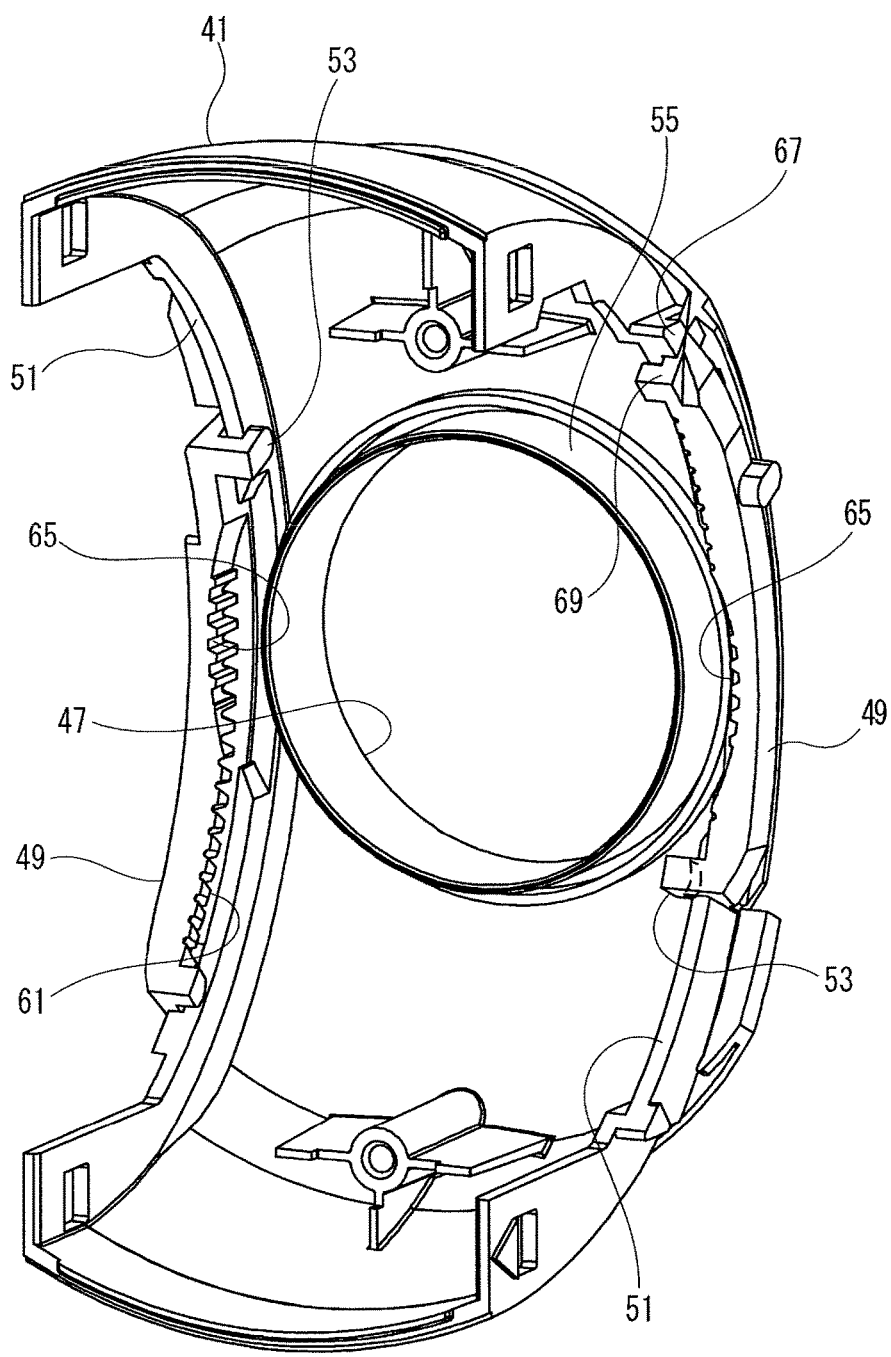
FIG. 6 is an assembly explanation diagram illustrating the lens cover with the light shielding plate attached thereto as seen from the rear side.

FIG. 6 is an assembly explanation diagram illustrating lens cover 41 with light shielding plate 43 attached thereto as seen from the rear side. The pair of light shielding plates 43 are attached to lens cover 41 so as to be slidable in a direction along rail 51 when pinching projection 53 of each arm 49 is engaged with rail 51 of lens cover 41. At this time, light shielding plate 43 is attached to lens cover 41 being positioned in a position in which contact end 69 of arm 49 comes into contact with assembly guide 67 (that is, the set position). When light shielding plate 43 is in the set position in which contact end 69 comes into contact with assembly guide 67, stopper 71 is fitted into stopper receiving hole 73 of arm 49. In this state, notches 65 of a pair of arms 49 are disposed close to the opposite ends in the radial direction of circumferential wall 55.

Figure 7:
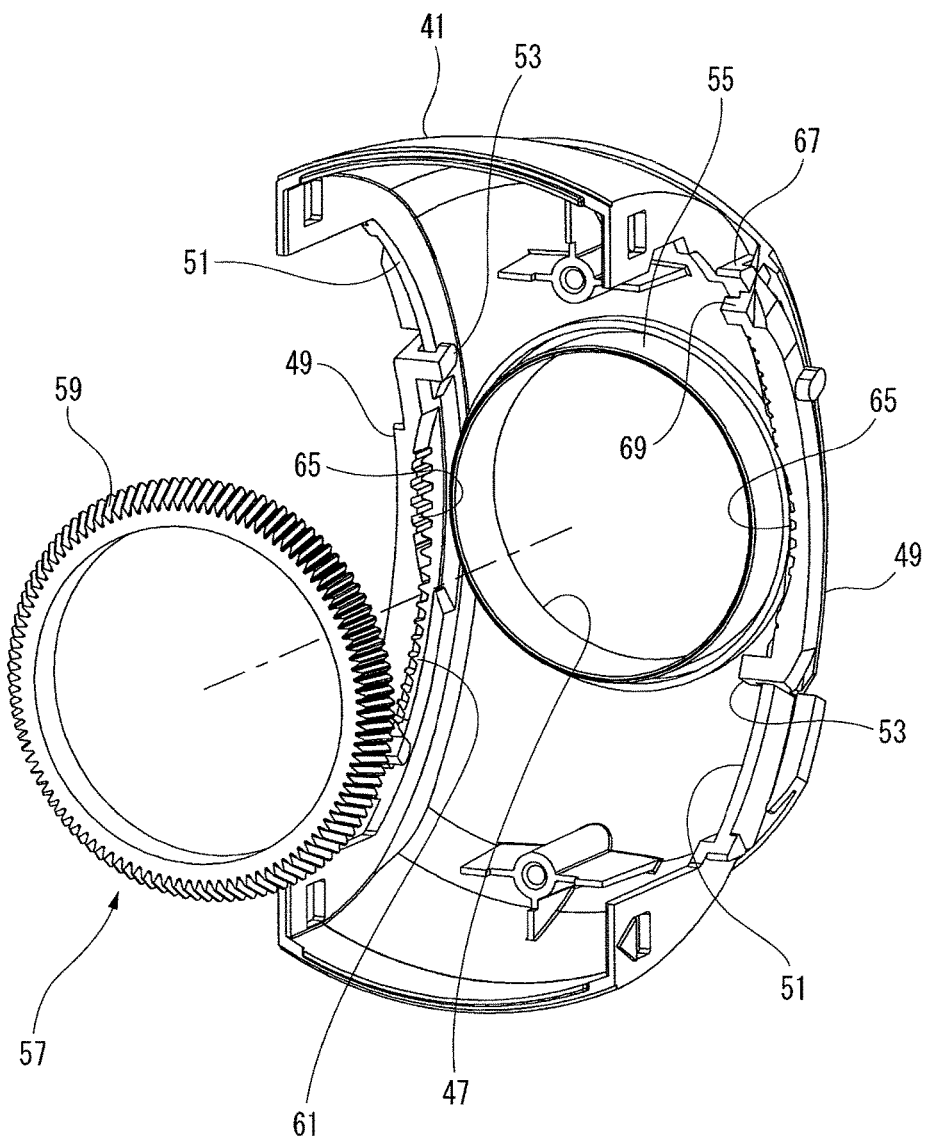
FIG. 7 is an assembly explanation diagram illustrating the lens cover immediately before the ring gear is attached thereto as seen from the rear side.
Figure 8:
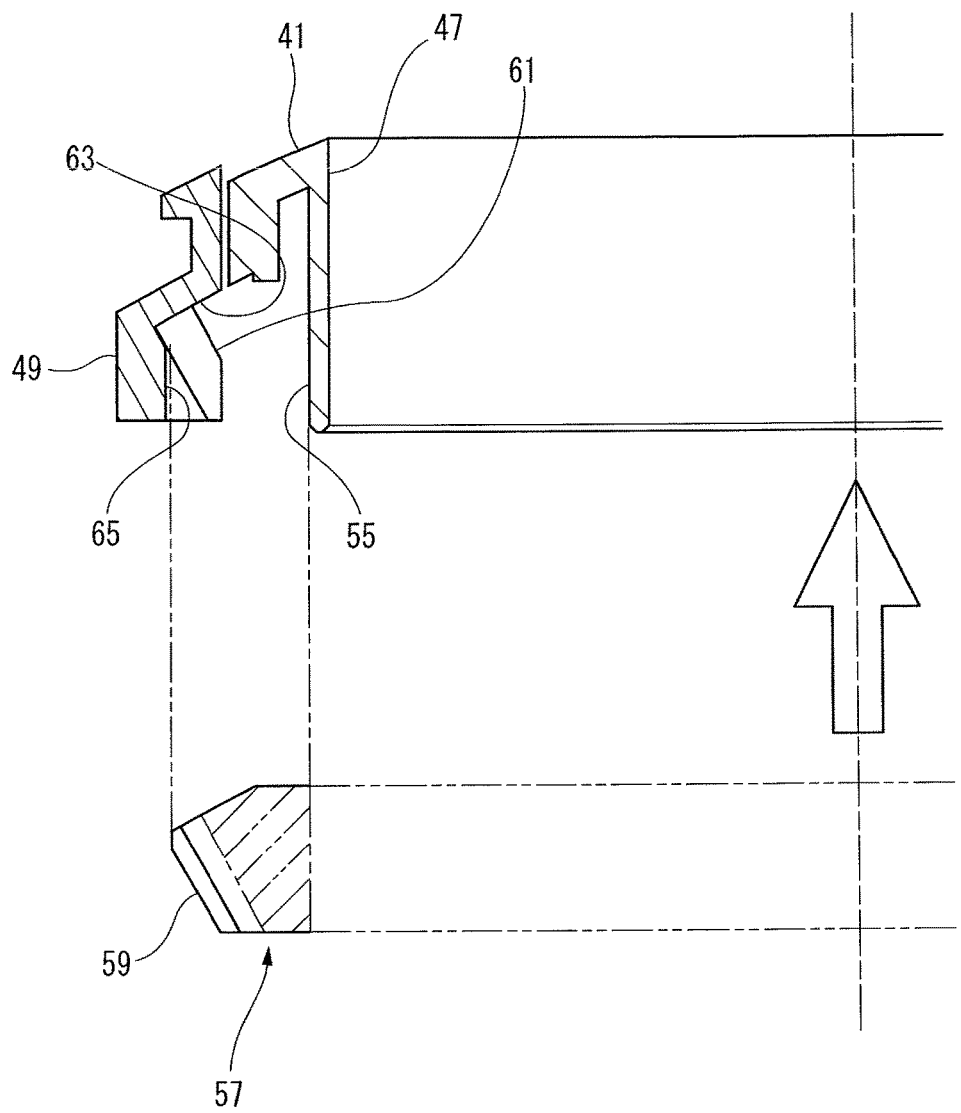
FIG. 8 is a sectional view illustrating a main portion of the lens cover and a rack immediately before the ring gear is attached.

FIG. 7 is an assembly explanation diagram illustrating lens cover 41 immediately before ring gear 57 is attached thereto as seen from the rear side. FIG. 8 is a sectional view illustrating a main portion of lens cover 41 and a rack immediately before ring gear 57 is attached.

As illustrated in FIG. 7, when the pair of light shielding plates 43 are in the set position, ring gear 57 is externally fitted onto circumferential wall 55 of lens cover 41. Ring gear 57 can be inserted without interference between tip ends of bevel teeth 59 (shown in FIG. 8) on opposite sides in the radial direction and inclined rack 61 using notch 65 which is formed on arm 49.

Figure 9:
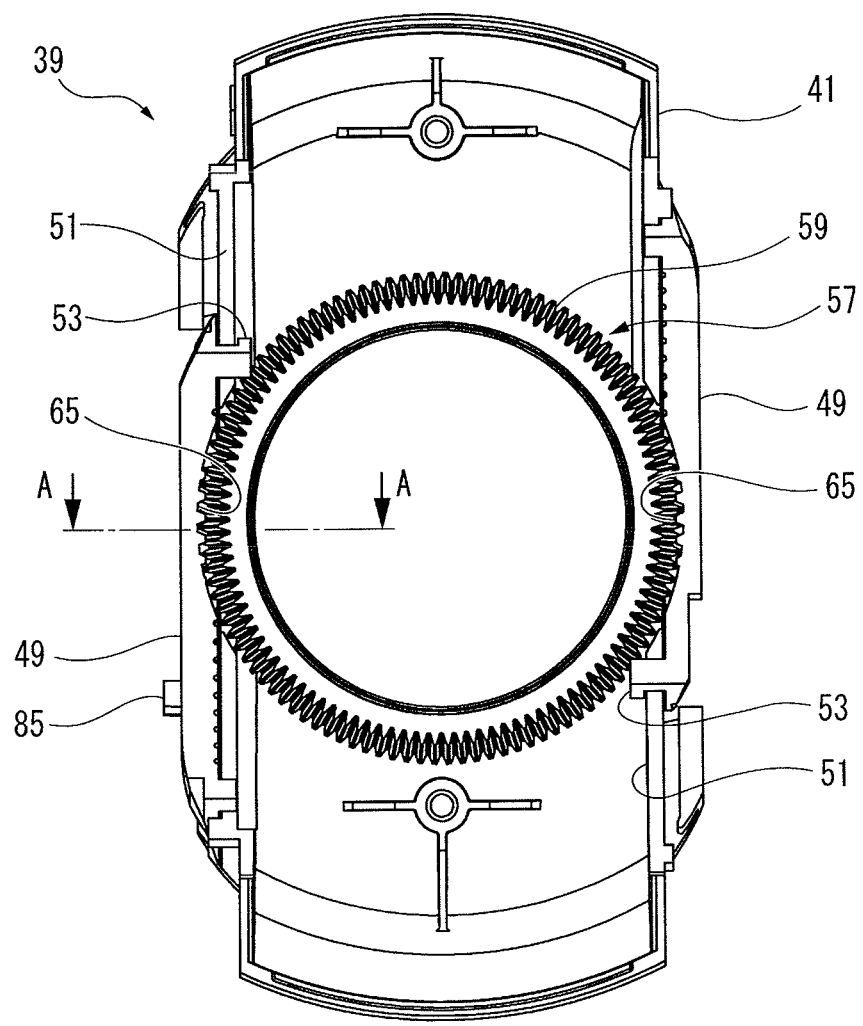
FIG. 9 is an assembly explanation diagram illustrating the lens cover with the ring gear attached thereto as seen from the rear side.

FIG. 9 is an assembly explanation diagram illustrating lens cover 41 with ring gear 57 attached thereto as seen from the rear side. As illustrated in FIG. 9, ring gear 57 is attached to a rear surface of lens cover 41. At this time, contact ends 69 of the pair of light shielding plates 43 comes into contact with assembly guide 67, and stopper 71 is fitted into stopper receiving hole 73.

Figure 10:
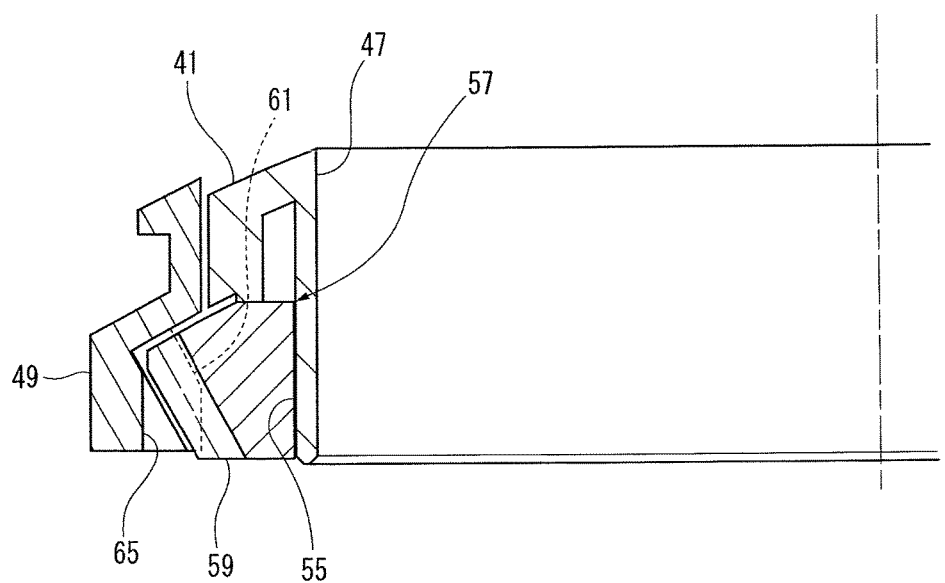
FIG. 10 is a sectional view taken along line A-A in FIG. 9.

FIG. 10 is a sectional view taken along line A-A in FIG. 9. Bevel teeth 59 of ring gear 57 which is attached to the rear surface of lens cover 41 are disposed in notch 65. In the set position, although a portion of inclined rack 61 is removed by notch 65 for the attachment of ring gear 57, a remaining portion of inclined rack 61 meshes with bevel teeth 59 of ring gear 57 without inhibiting the attachment. That is, in the set position, ring gear 57 and inclined rack 61 can be interlocked.

Figure 11:
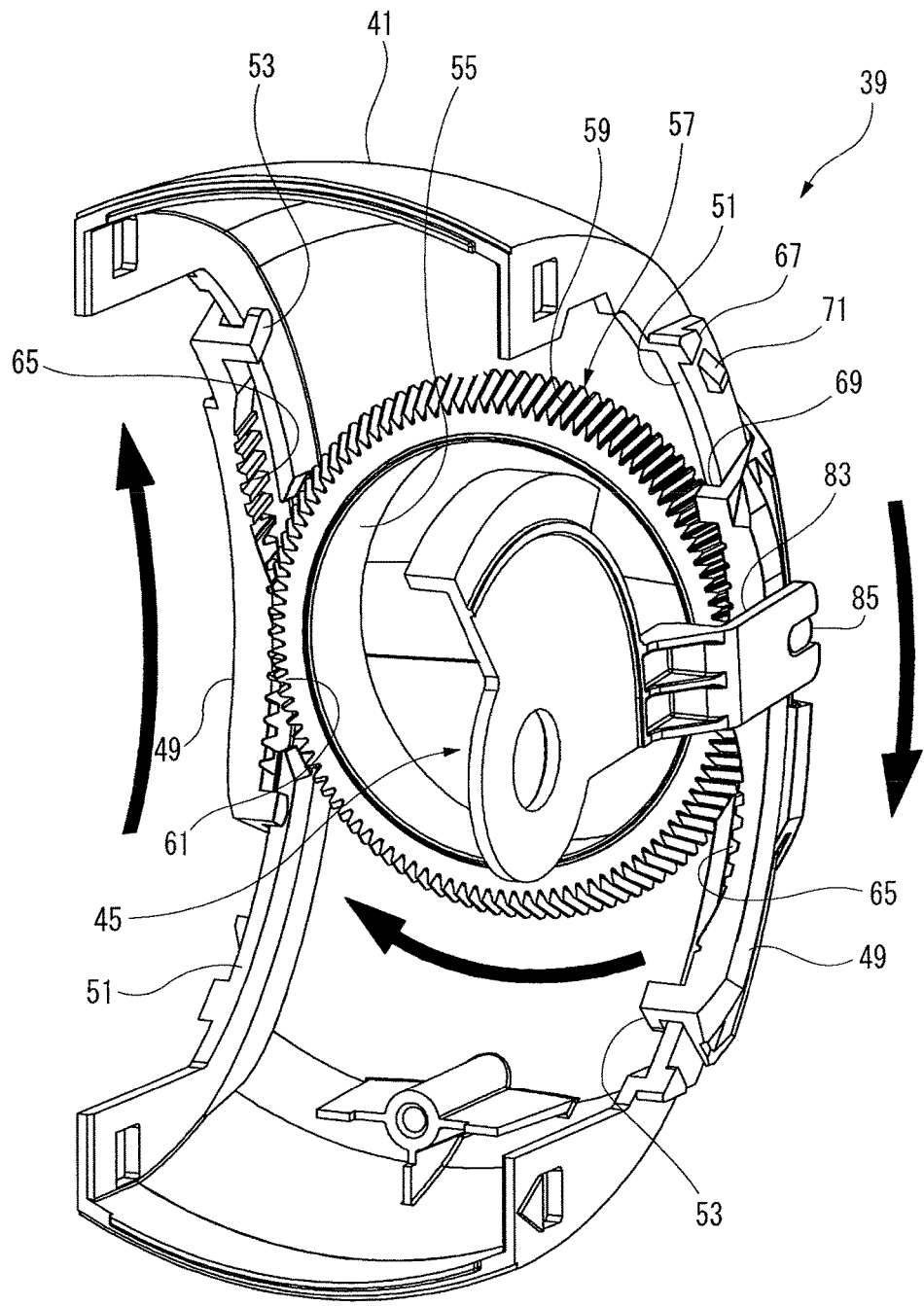
FIG. 11 is an assembly explanation diagram illustrating the lens cover as seen from the rear side in which racks are moved.

FIG. 11 is an assembly explanation diagram illustrating lens cover 41 as seen from the rear side in which racks are moved. In the set position, one light shielding plate 43 slides in a closing direction when opening and closing motor 77 is driven. One light shielding plate 43 may be slid in the closing direction manually.

Figure 12:
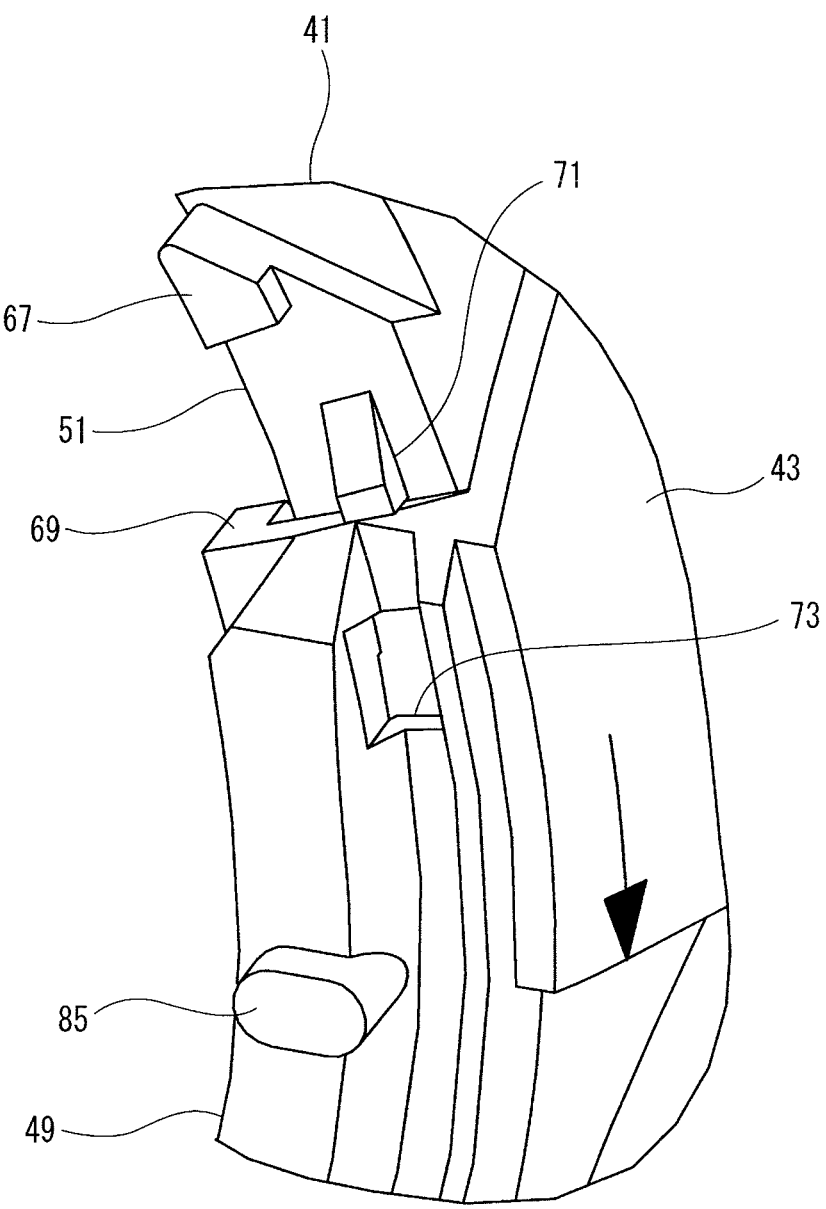
FIG. 12 is an enlarged view illustrating a main portion of the light shielding plate immediately after a contact end passes over a stopper.

FIG. 12 is an enlarged view illustrating a main portion of light shielding plate 43 immediately after contact end 69 passes over stopper 71. When light shielding plate 43 in the set position is moved to be closed, contact end 69 being in contact with assembly guide 67 slides up the inclined surface of stopper 71 to pass over stopper 71. When contact end 69 passes over stopper 71, contact end 69 comes into contact with a vertical surface of stopper 71, and thus returning to the set position is inhibited.

Figure 13:
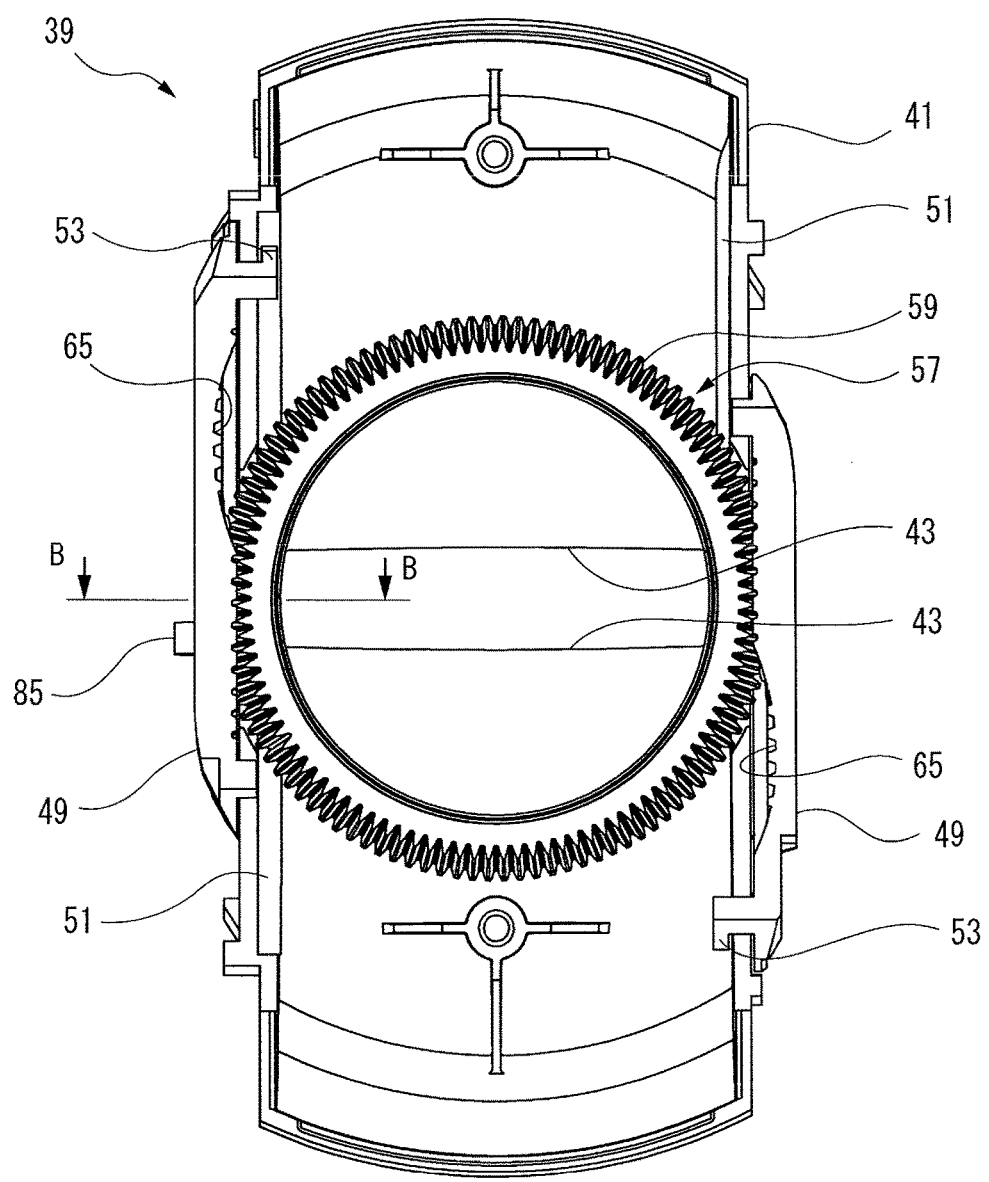
FIG. 13 is an assembly explanation diagram illustrating the lens cover as seen from the rear side in which the racks are moved.
Figure 14:
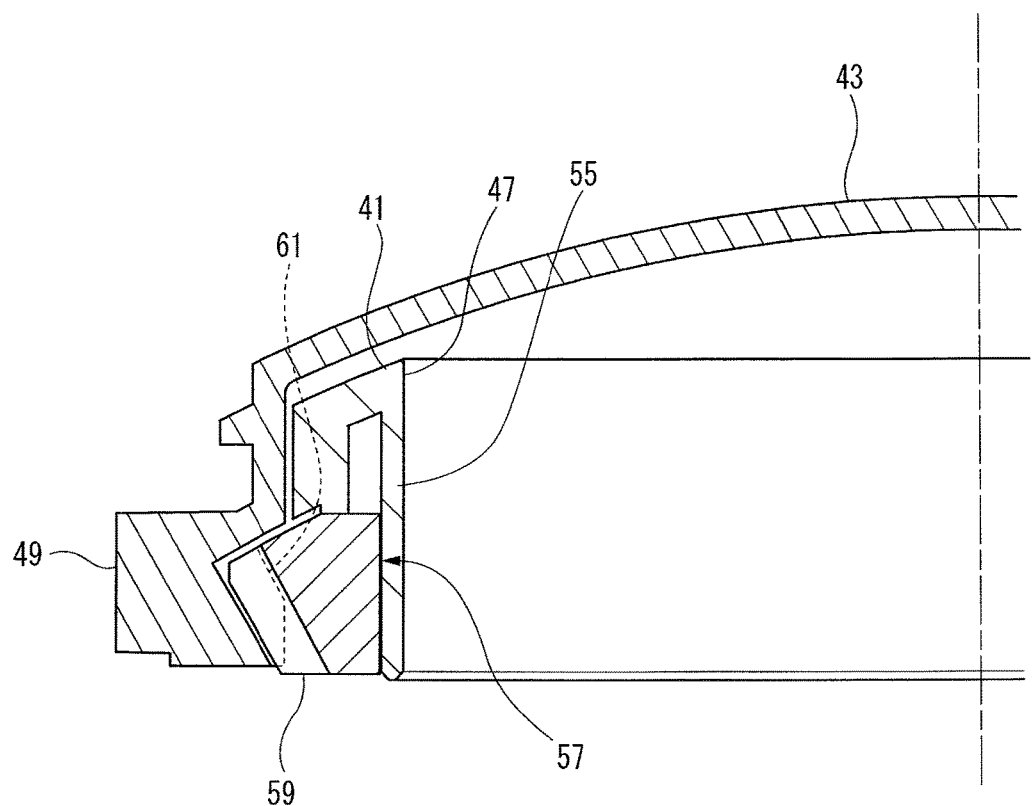
FIG. 14 is a sectional view taken along line B-B in FIG. 13.

FIG. 13 is an assembly explanation diagram illustrating lens cover 41 as seen from the rear side in which the racks are moved. FIG. 14 is a sectional view taken along line B-B in FIG. 13. As illustrated in FIG. 13, when arm 49 is slid from the set position, notch 65 is separated from bevel teeth 59 of ring gear 57. As illustrated in FIG. 14, inclined rack 61 of arm 49 meshes with bevel teeth 59 of ring gear 57. Falling off of ring gear 57 from lens cover 41 is restricted with bevel teeth 59 on the opposite sides in the radial direction clamped by inclined rack 61 and lens cover 41. In this manner, the assembly of lens cover assembly 39 is finished in which ring gear 57 clamped by lens cover 41 and the pair of light shielding plates 43.

Next, an operation of the imaging apparatus will be described.

Figure 15:
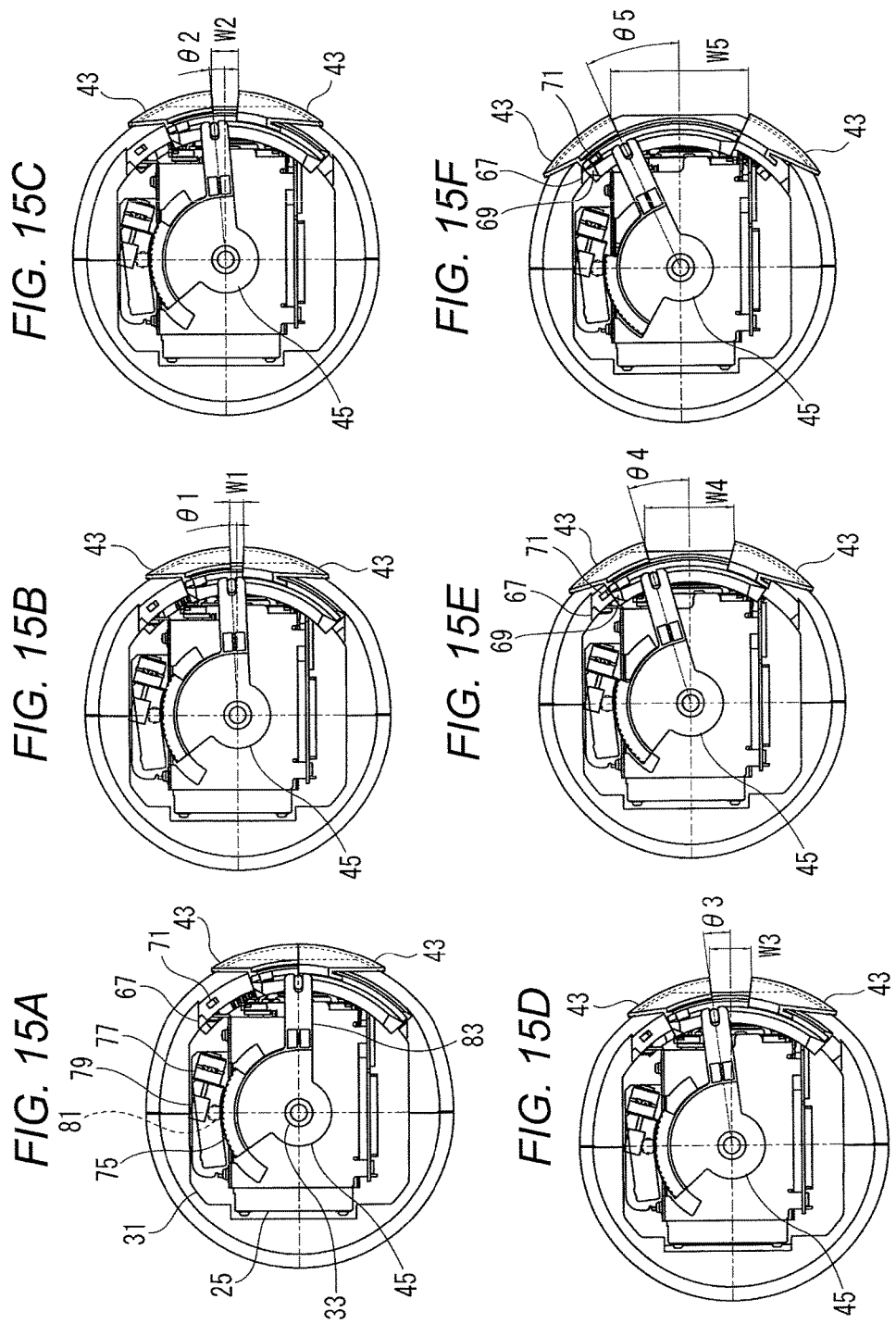
FIGS. 15A to 15E are operation explanation diagrams illustrating an opening process of a pair of light shielding plates and FIG. 15F is an operation explanation diagram illustrating a state where the light shielding plate is in a position for attachment of the ring gear.

FIGS. 15A to 15E are operation explanation diagrams illustrating an opening process of the pair of light shielding plates 43. FIG. 15F is an operation explanation diagram illustrating a state where light shielding plate 43 is in a position for attachment of the ring gear. As illustrated in FIG. 15A, in surveillance camera 11, when light shielding plate 43 is closed, light receiving hole 47 is closed with closing ends of the pair of light shielding plates 43 abutting each other. As illustrated in FIG. 15B, when opening and closing motor 77 is driven and opening and closing lever 45 swings with a rotation angle of θ1 (for example, 2.4 degrees), the pair of light shielding plates 43 move in different directions, and light receiving hole 47 is open with clearance W1 (for example, 5 mm) between the closing ends. As illustrated in FIG. 15C, when opening and closing motor 77 is driven and opening and closing lever 45 swings with a rotation angle of θ2 (for example, 4.8 degrees), the pair of light shielding plates 43 move in different directions, and light receiving hole 47 is open with clearance W2 (for example, 10 mm) between the closing ends. As illustrated in FIG. 15D, when opening and closing motor 77 is driven and opening and closing lever 45 swings with a rotation angle of θ3 (for example, 7.2 degrees), the pair of light shielding plates 43 move in different directions, and light receiving hole 47 is open with clearance W3 (for example, 15 mm)

between the closing ends. As illustrated in FIG. 15E, when opening and closing motor 77 is driven and opening and closing lever 45 swings with a rotation angle of θ4 (for example, 16 degrees), the pair of light shielding plates 43 move in different directions, and light receiving hole 47 is open with clearance W4 (for example, 33 mm) between the closing ends.

The stoppage of light shielding plate 43 which has reached a fully closed position or a fully-open position can be performed by disconnecting power to opening and closing motor 77 when overload driving is detected, by providing an overload-separation mechanism between deceleration gear 81 and input tooth portion 75, or the like.

In lens cover assembly 39, when ring gear 57 is detached from lens cover 41 for maintenance or the like, contact end 69 shown in FIG. 12 is wrenched using a jig or the like so that contact end 69 passes over stopper 71. In this manner, as illustrated in FIG. 15F, contact end 69 of arm 49 can be disposed in a position in which contact end 69 comes into contact with assembly guide 67. That is, contact end 69 can be returned to the set position. In the set position, interference between inclined rack 61 and bevel teeth 59 is prevented by notch 65, and thus it is possible to remove ring gear 57. In the set position, opening and closing lever 45 swings with a rotation angle of θ5 (for example, 25 degrees) with clearance W5 (for example, 50 mm) between the closing ends of the pair of light shielding plates 43.

Next, an operation of the above described configuration will be described.

In surveillance camera 11 according to the first exemplary embodiment, when one light shielding plate 43 moves, ring gear 57 meshing with inclined rack 61 of one light shielding plate 43 rotates. When ring gear 57 rotates, inclined rack 61 of other light shielding plate 43 meshing with ring gear 57 moves. Since respective inclined racks 61 of light shielding plates 43 mesh with the opposite ends in the radial direction of ring gear 57, when ring gear 57 rotates in one direction, inclined racks 61 move in opposite directions (a direction of approach and separation). In this manner, the pair of light shielding plates 43 open and close light receiving hole 47. That is, in surveillance camera 11, with only three components of the pair of light shielding plates 43 and one ring gear 57, in other words, with a small number of components, it is possible to open and close light receiving hole 47.

In addition, in surveillance camera 11, before the attachment of ring gear 57, the pair of light shielding plates 43 are disposed in the set position. When the pair of light shielding plates 43 are disposed in the set position, respective notches 65 of the pair of light shielding plates 43 are disposed such that ring gear 57 can be attached (that is, notches 65 are disposed close to the opposite ends in the radial direction of ring gear 57). Accordingly, ring gear 57 can be inserted between a pair of inclined racks 61 without interfering with inclined rack 61. When ring gear 57 in the set position rotates, each inclined rack 61 meshing with ring gear 57 moves. Notch 65 of moving inclined rack 61 moves from the circumference of ring gear 57. As a result, a portion in a detachment direction of ring gear 57 is covered by inclined rack 61, and ring gear 57 is restricted from being detached from the cover.

In addition, in surveillance camera 11, the cover is provided with a pair of assembly guides 67. Each assembly guide 67 is in contact with light shielding plate 43 in the set position (a position in which ring gear 57 can be attached). When light shielding plate 43 comes into contact with assembly guide 67, light shielding plate 43 is restricted from moving further in an opening direction. Accordingly, positioning of notch 65 during the attachment of ring gear 57 can be easily performed.

In addition, in surveillance camera 11, stopper 71 is provided closer to a closing side of light shielding plate 43 than assembly guide 67 is. Stopper 71 has the inclined surface that contact end 69 can slide up. Therefore, when light shielding plate 43 moves from the set position in the closing direction, contact end 69 passes over stopper 71. When contact end 69 passes over stopper 71, stopper 71 inhibits contact end 69 from returning (moving in a direction toward assembly guide 67). The fully-open position of light shielding plate 43 is a position in which opening of light shielding plate 43 is restricted by stopper 71. In the fully-open position, notch 65 of inclined rack 61 is separated from the circumference of ring gear 57. That is, in the fully-open position, detachment of ring gear 57 is restricted. Since stopper 71 inhibits light shielding plate 43 from returning to the set position, falling-off of ring gear 57 does not occur during a normal operation.

In addition, in surveillance camera 11, one opening and closing lever 45 swings one light shielding plate 43. When one light shielding plate 43 swings, ring gear 57 meshing with inclined rack 61 rotates, and thus other light shielding plate 43 rotates. That is, the pair of light shielding plates 43 are open or closed by being driven by only one opening and closing lever 45 with a simple mechanism. In opening and closing lever 45, input tooth portion 75 extending in a swing direction meshes with worm 79 that is fixed to a driving shaft of opening and closing motor 77. Therefore, a rotation force from opening and closing motor 77 is transmitted to the pair of light shielding plates 43 via opening and closing lever 45. An external force which opens or closes the pair of light shielding plates 43 is suppressed by meshing between input tooth portion 75 and worm 79. That is, light shielding plate 43 can includes a self-lock mechanism which is not open and closed by an external force.

Therefore, with surveillance camera 11 according to the first exemplary embodiment, it is possible to perform the opening and closing operation in which the pair of light shielding plates 43 move in different directions with a simple configuration.

Second Exemplary Embodiment

Next, a second exemplary embodiment of the imaging apparatus according to the disclosure will be described.

Figure 16:
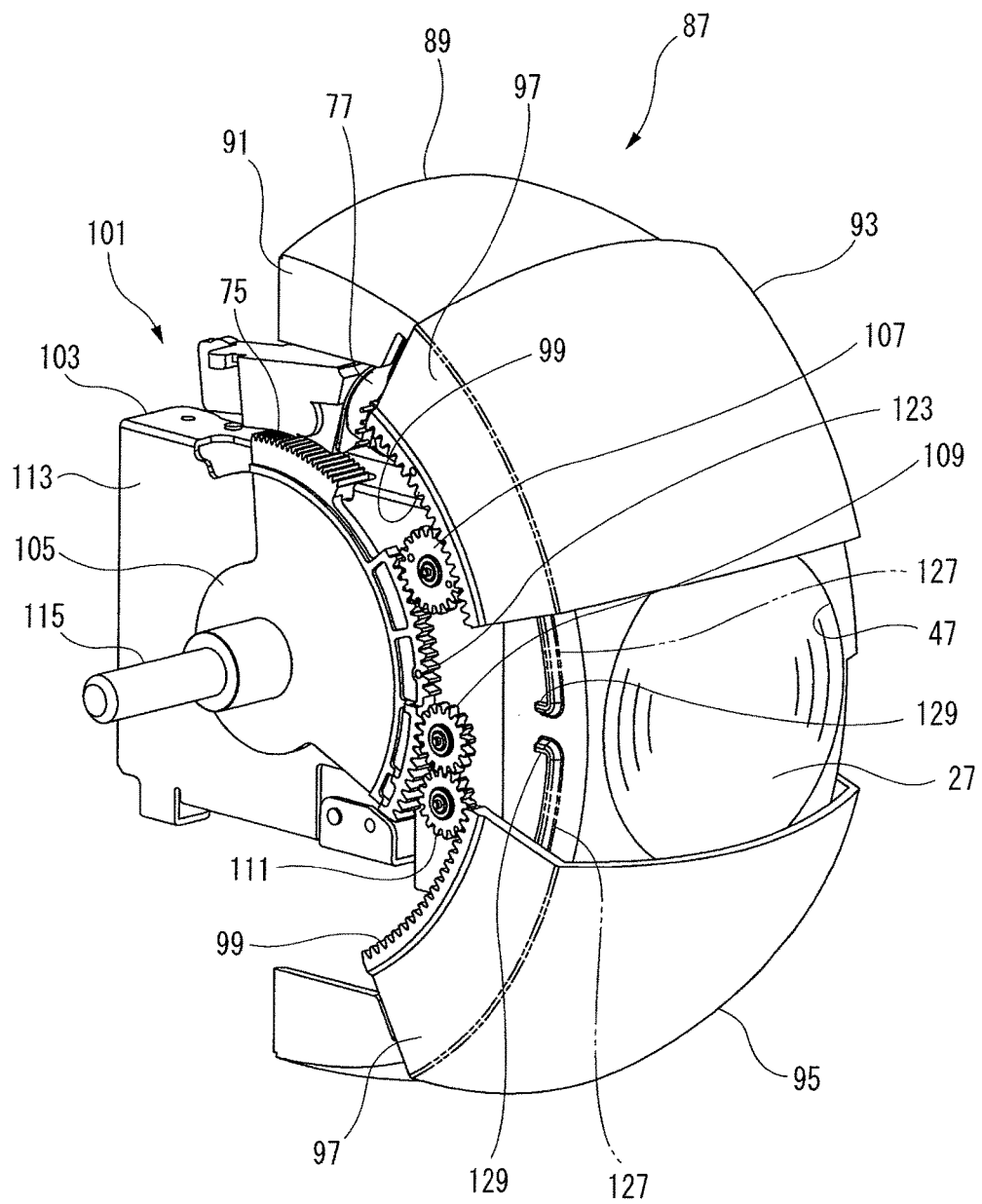
FIG. 16 is a perspective view illustrating a main portion of an imaging apparatus according to a second exemplary embodiment.

FIG. 16 is a perspective view illustrating a main portion of an imaging apparatus according to a second exemplary embodiment. The same components as the components shown in FIGS. 1 to 15F are given the same reference numbers and repetitive description thereof will be omitted.

Surveillance camera 11 according to the second exemplary embodiment includes lens cover assembly 87. Lens cover assembly 87 includes rectangular curved plate-shaped lens cover 89. On the central portion of lens cover 89, light receiving hole 47 is formed. In light receiving hole 47, lens 27 is disposed. Lens cover 89 includes a pair of parallel cover side plates 91 which extend from a cover outer surface toward a camera. A pair of light shielding plates 93 and 95 are attached to the cover outer surface with light receiving hole 47 interposed therebetween such that the pair of light shielding plates 93 and 95 can slide freely in a direction of approach and separation. Each of the pair of light shielding plates 93 and 95 include a pair of sliding plates 97 which are parallel to cover side plate 91. The pair of parallel sliding plates 97 clamp cover side plate 91 of lens cover 89 from the outside to slidably hold light shielding plates 93 and 95 to lens cover 89.

One of the pair of sliding plates 97 of each of light shielding plates 93 and 95 is provided with plate rack 99 formed thereon. Plate rack 99 is formed into an arc shape along an edge portion of sliding plate 97.

Figure 22:
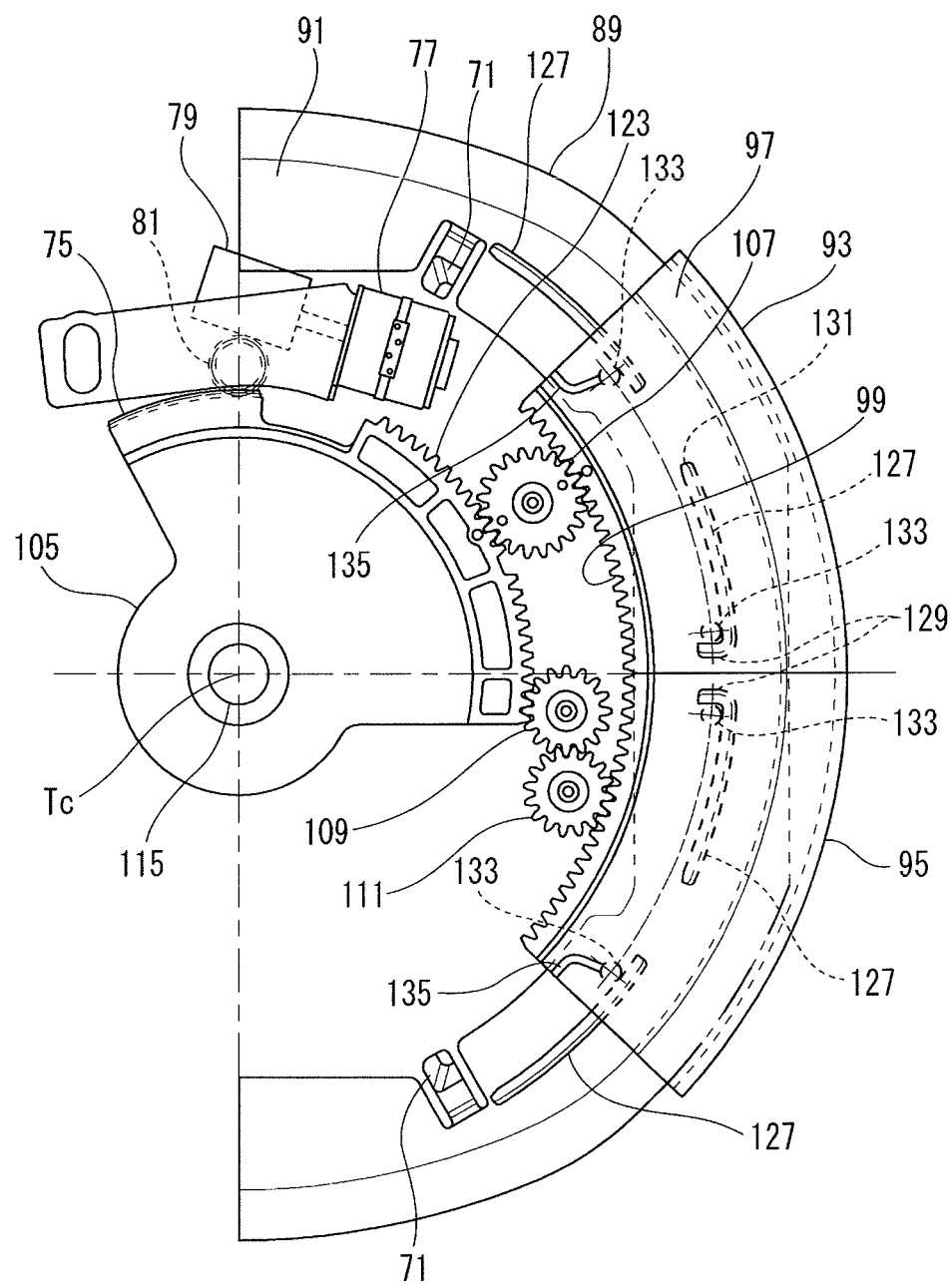
FIG. 22 is an operation explanation diagram illustrating a state where the light shielding plate of the imaging apparatus is closed.

Light shielding plates 93 and 95 are formed to have the substantially same outer shape. However, a portion (described below) of light shielding plate 93 and a portion of light shielding plate 95, which restrict light shielding plates 93 and 95 from being detached from lens cover 89, form a horizontally symmetrical shape as shown in FIG. 22. Therefore, the surveillance camera needs to include two types of light shielding plates 93 and 95.

Light shielding plates 93 and 95 are open and closed being driven by light shielding plate driving gear unit 101 which is attached to one surface of lens cover 89. Light shielding plate driving gear unit 101 includes lens frame 103, main gear 105, first idle gear 107, second idle gear 109, reversing gear 111, and opening and closing motor 77 as main components.

Figure 17:
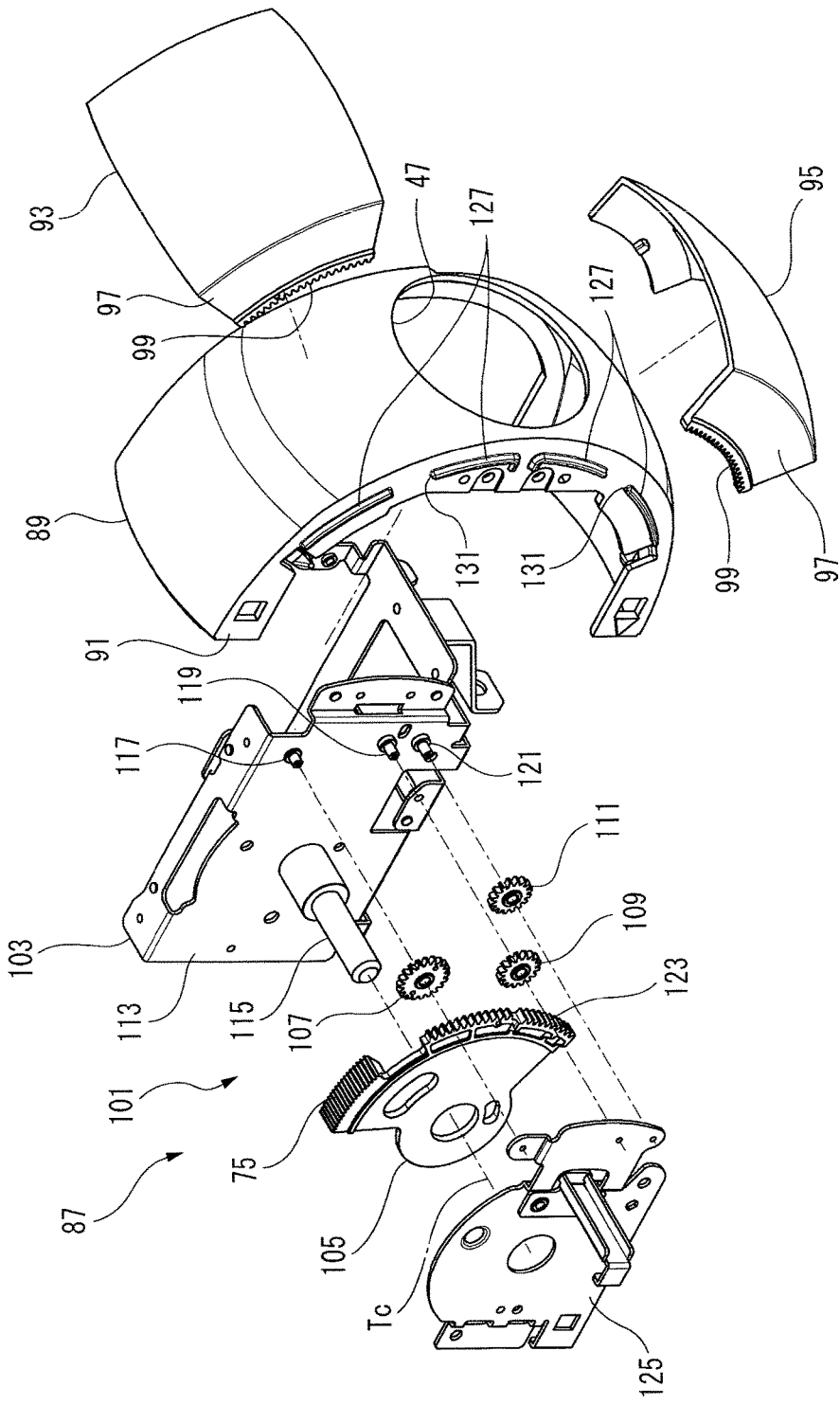
FIG. 17 is an exploded perspective view illustrating the imaging apparatus shown in FIG. 16.

FIG. 17 is an exploded perspective view illustrating the imaging apparatus shown in FIG. 16. Lens frame 103 is configured using a plate metal material, and includes main gear spindle 115 which is parallel to tilt rotation center Tc and is formed on frame side plate 113 which is orthogonal to tilt rotation center Tc. Main gear spindle 115 rotatably supports main gear 105. In addition, frame side plate 113 includes first spindle 117 which rotatably supports first idle gear 107, second spindle 119 which rotatably supports second idle gear 109, and reversing gear spindle 121 which rotatably supports reversing gear 111.

Main gear 105 is formed into a fan-like shape and input tooth portion 75 and output tooth portion 123 are formed in a direction along an arc formed by the outer circumferential portion of main gear 105. Main gear 105 is attached to main gear spindle 115 with input tooth portion 75 and output tooth portion 123 facing sliding plate 97 of light shielding plates 93 and 95.

First idle gear 107 is supported by first spindle 117. When first idle gear 107 is attached to first spindle 117, first idle gear 107 meshes with output tooth portion 123 of main gear 105 and plate rack 99 of sliding plate 97 of light shielding plate 93.

Second idle gear 109 is supported by second spindle 119. When second idle gear 109 is attached to second spindle 119, second idle gear 109 meshes with reversing gear 111. Second idle gear 109 does not directly mesh with plate rack 99 of light shielding plate 95.

Reversing gear 111 is supported by reversing gear spindle 121. When reversing gear 111 is attached to reversing gear spindle 121, reversing gear 111 meshes with second idle gear 109 and plate rack 99 of light shielding plate 95. That is, due to reversing gear 111, rotation of second idle gear 109 is transmitted to light shielding plate 95 in a direction opposite to a direction in which rotation of first idle gear 107 is transmitted. Accordingly, with rotation of one main gear 105 in one direction, light shielding plates 93 and 95 slide in opposite directions and approach and be separated from each other to open and close light receiving hole 47.

Opening and closing motor 77 is fixed to lens frame 103. Worm 79 is fixed to a driving shaft of opening and closing motor 77. Worm 79 meshes with input tooth portion 75 of main gear 105 via deceleration gear 81 which is supported by frame side plate 113.

Gear retaining plate 125 is fixed to frame side plate 113 with main gear 105 or the like interposed therebetween. Gear retaining plate 125 restricts main gear 105, first idle gear 107, second idle gear 109, and reversing gear 111 from falling off each spindle.

Therefore, in the surveillance camera, when opening and closing motor 77 is driven and main gear 105 rotates in normal and reverse directions via worm 79 and deceleration gear 81, light shielding plate 93 and light shielding plate 95 slide in a direction of approach and separation via first idle gear 107 and reversing gear 111 to open and close light receiving hole 47.

Figure 18:
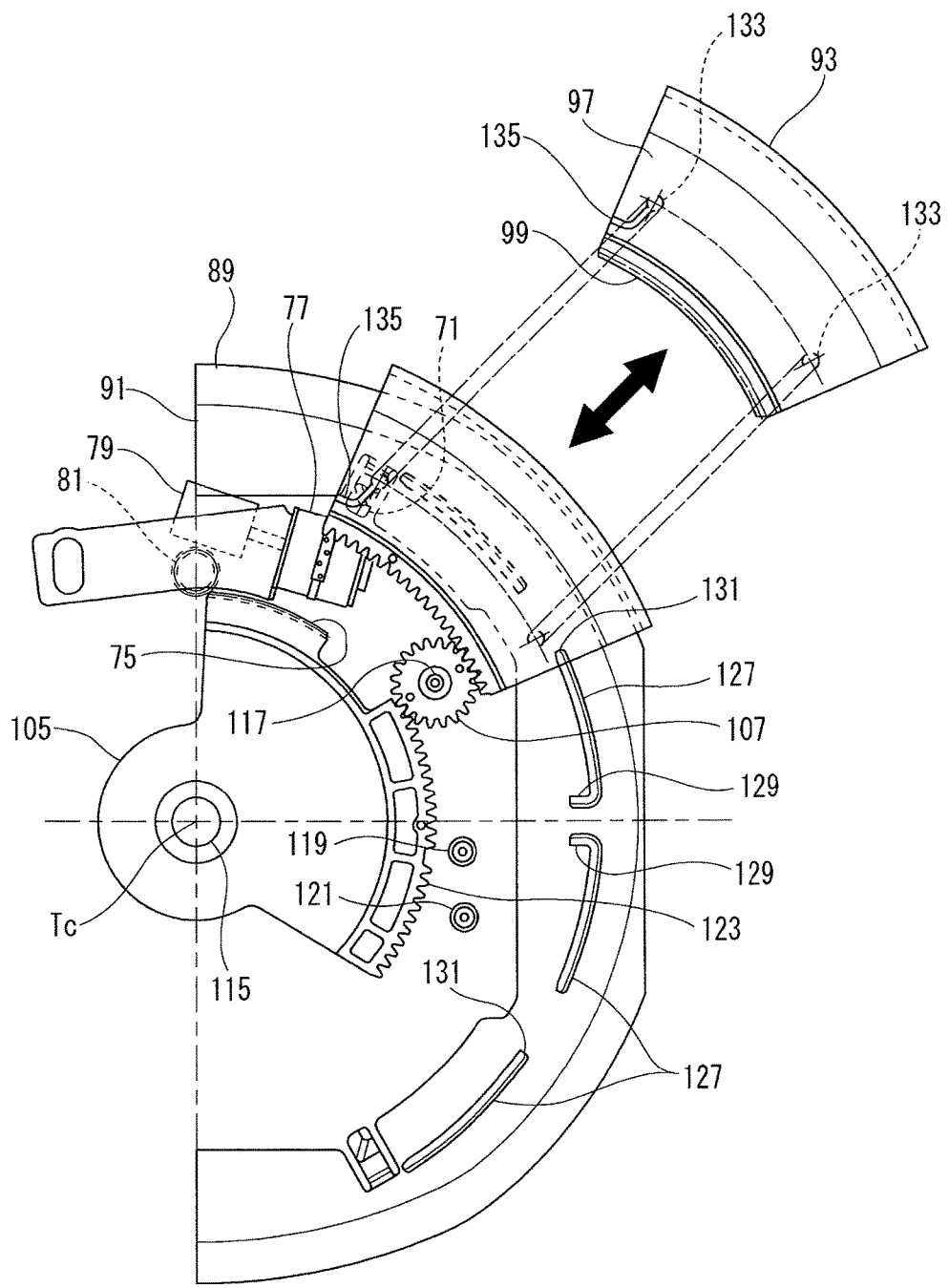
FIG. 18 is an assembly explanation diagram illustrating a state immediately before the light shielding plate is attached.

FIG. 18 is an assembly explanation diagram illustrating a state immediately before light shielding plate 93 is attached. On each cover side plate 91 of lens cover 89, protrusion rail 127 which has an arc shape along a sliding direction of light shielding plates 93 and 95 is formed corresponding to each of light shielding plates 93 and 95. The pair of protrusion rails 127 include stopper bent portions 129 which are formed to be close to respective closing ends of light shielding plates 93 and 95. In addition, each protrusion rail 127 includes dividing portion 131 which is obtained by removing a portion of protrusion rail 127. Dividing portion 131 is closer to an opening side of light shielding plates 93 and 95 than stopper bent portion 129 is. Furthermore, on cover side plate 91, on the opposite side of stopper bent portion 129 with respect to dividing portion 131, stopper 71 protrudes. Stopper 71 is slightly separated from an end of the protrusion rail.

Figure 19:
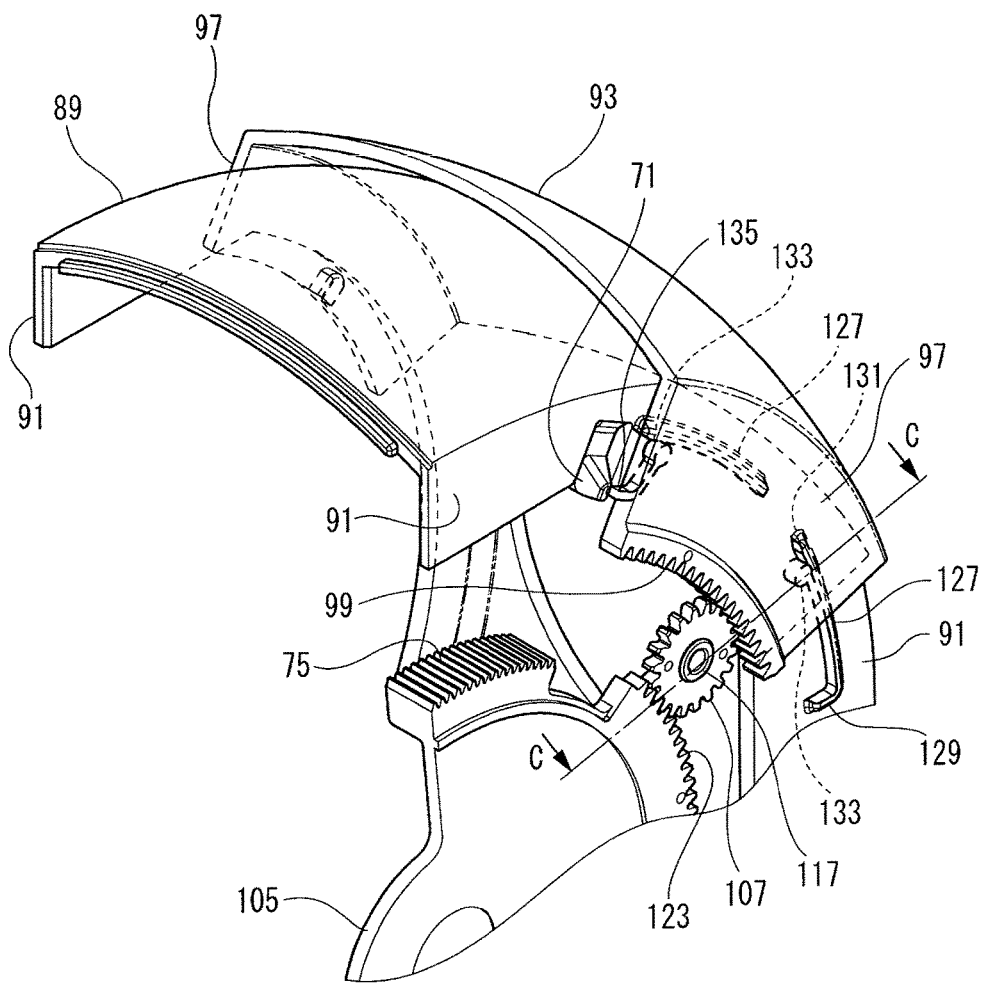
FIG. 19 is an assembly explanation diagram illustrating a state where the attached light shielding plate is rotated from an attachment position.
Figure 20:
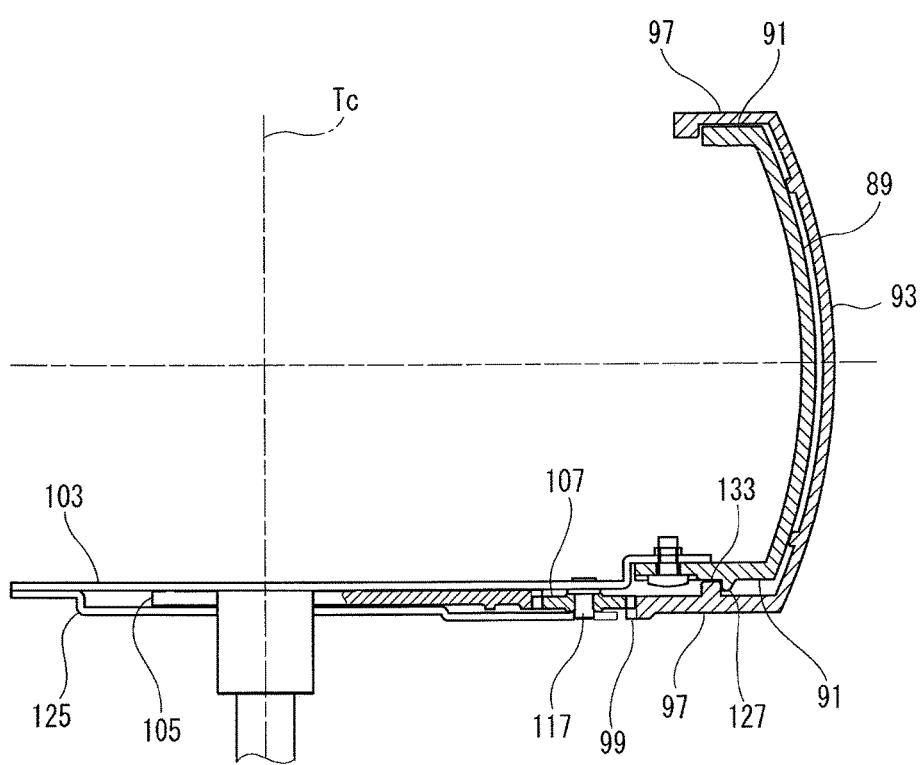
FIG. 20 is a sectional view taken along line C-C in FIG. 19.
Figure 21:
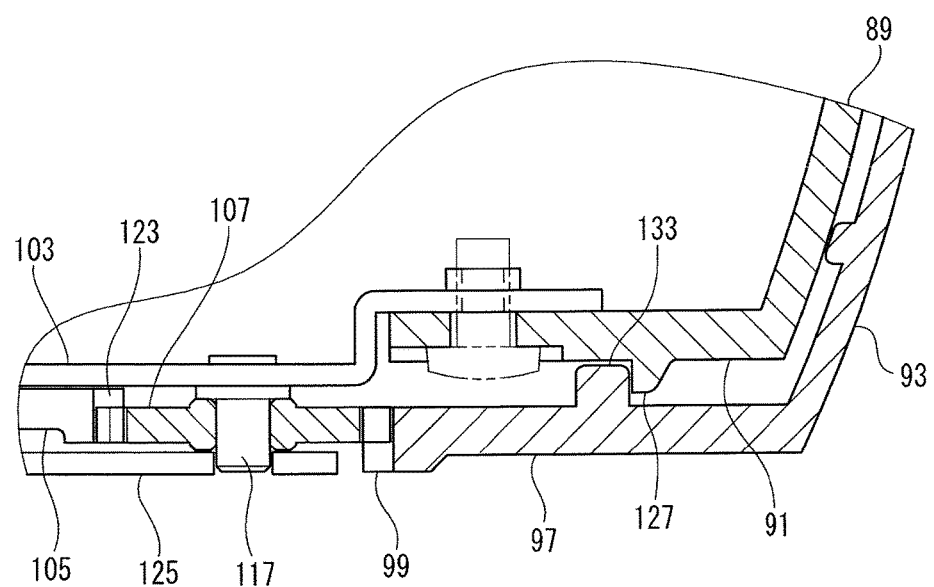
FIG. 21 is an enlarged view illustrating a main portion in FIG. 20.

FIG. 19 is an assembly explanation diagram illustrating a state where attached light shielding plate 93 is rotated from an attachment position. FIG. 20 is a sectional view taken along line C-C in FIG. 19. FIG. 21 is an enlarged view illustrating a main portion in FIG. 20. As illustrated in FIGS. 18 and 19, on an inner surface of sliding plate 97 of each of light shielding plates 93 and 95, which faces protrusion rail 127, a pair of rail engagement protrusions 133 protrude. The pair of rail engagement protrusions 133 are separated from each other in the sliding direction.

When rail engagement protrusion 133 comes into contact with a side surface of protrusion rail 127, rail engagement protrusion 133 restricts light shielding plates 93 and 95 from being detached from lens cover 89. Accordingly, as illustrated in FIGS. 20 and 21, light shielding plates 93 and 95 are held to lens cover 89 such that plate rack 99 is not separated from first idle gear 107 or reversing gear 111.

One of the pair of rail engagement protrusions 133 which is close to an opening end is provided with L-shaped elastic restriction pin 135 as shown in FIG. 19. Elastic restriction pin 135 comes into contact with stopper 71 when light shielding plates 93 and 95 are in the fully-open position and restricts light shielding plates 93 and 95 from opening wider.

Next, an assembly procedure of the surveillance camera will be described.

As illustrated in FIG. 18, when light shielding plates 93 and 95 are attached to lens cover 89, elastic restriction pin 135 is disposed closer to the outside than stopper 71 is (the opposite side of dividing portion 131 with respect to stopper 71). This position is the set position of light shielding plates 93 and 95. At this time, rail engagement protrusion 133 without elastic restriction pin 135 can pass through dividing portion 131 and can be disposed close to an inner side of protrusion rail 127 (that is, close to main gear 105).

When worm 79 rotates in the closing direction, light shielding plates 93 and 95 attached to lens cover 89 slide in the closing direction via first idle gear 107 and reversing gear 111 according to rotation of main gear 105. When light shielding plates 93 and 95 slide in the closing direction, elastic restriction pin 135 receives a reaction force from stopper 71 and is elastically deformed to pass over stopper 71. At the same time, the pair of rail engagement protrusions 133 move into the inside of protrusion rail 127, and restrict light shielding plates 93 and 95 from being separated from lens cover 89.

Elastic restriction pin 135 which has passed over stopper 71 is elastically returned and comes into contact with the opposite side (that is, the dividing portion side) of stopper 71. Elastic restriction pin 135 is formed into a shape with which elastic restriction pin 135 is not likely to return by passing over stopper 71 being elastically deformed. Therefore, after elastic restriction pin 135 moves from the set position and passes over stopper 71, light shielding plates 93 and 95 are restricted from opening wider with elastic restriction pin 135 coming into contact with stopper 71. This position is the fully-open position of light shielding plates 93 and 95.

Next, an operation of the surveillance camera will be described.

Figure 23:
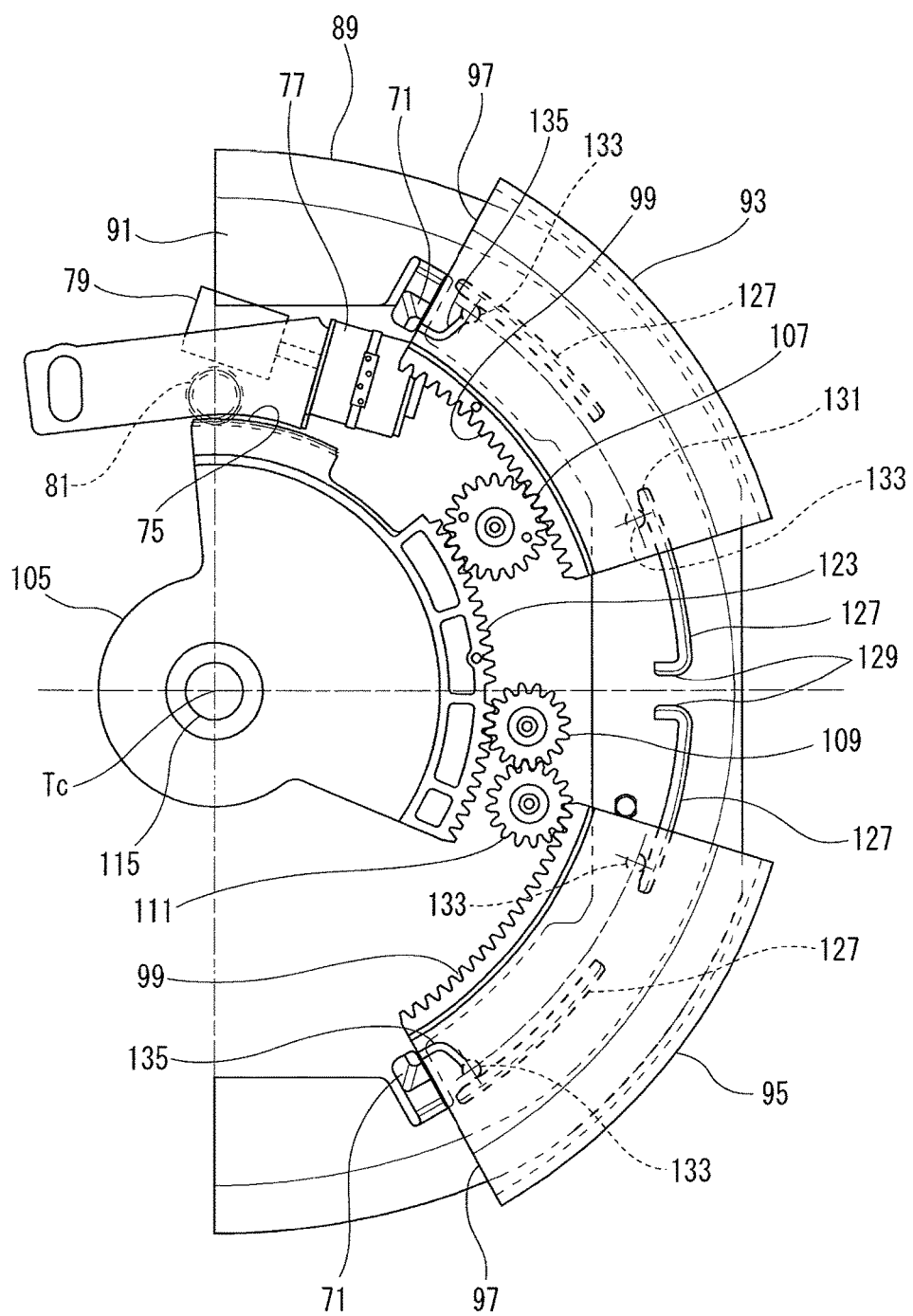
FIG. 23 is an operation explanation diagram illustrating a state where the light shielding plate of the imaging apparatus is open.

FIG. 22 is an operation explanation diagram illustrating a state where light shielding plate 93 of the imaging apparatus is closed. FIG. 23 is an operation explanation diagram illustrating a state where light shielding plate 93 of the imaging apparatus is open. As illustrated in FIG. 22, in surveillance camera 11, when light shielding plates 93 and 95 are closed, light receiving hole 47 is closed with closing ends of the pair of light shielding plates 93 and 95 abutting each other.

As illustrated in FIG. 23, when opening and closing motor 77 is driven and main gear 105 rotates in the opening direction via worm 79, plate rack 99 is driven via first idle gear 107 and reversing gear 111 such that the pair of light shielding plates 93 and 95 move in opposite directions and the closing ends are separated from each other. In this manner, in surveillance camera 11, light receiving hole 47 is opened. When elastic restriction pin 135 comes into contact with stopper 71, light shielding plates 93 and 95 move to the fully-open position, and are restricted from opening wider.

The stoppage of light shielding plates 93 and 95 which has reached a fully-closed position or the fully-open position can be performed by disconnecting power to opening and closing motor 77 when overload driving is detected, by providing a overload-separation mechanism between deceleration gear 81 and input tooth portion 75, or the like.

Therefore, with surveillance camera 11 according to the second exemplary embodiment, it is possible to configure light shielding plate driving gear unit 101 at low cost by using commercially available first idle gear 107, second idle gear 109, reversing gear 111, or the like.

Third Exemplary Embodiment

Next, a third exemplary embodiment of surveillance camera 11 according to the disclosure will be described. The same components as the components shown in FIGS. 1 to 23 are given the same reference numbers and repetitive description thereof will be omitted.

Figure 24:
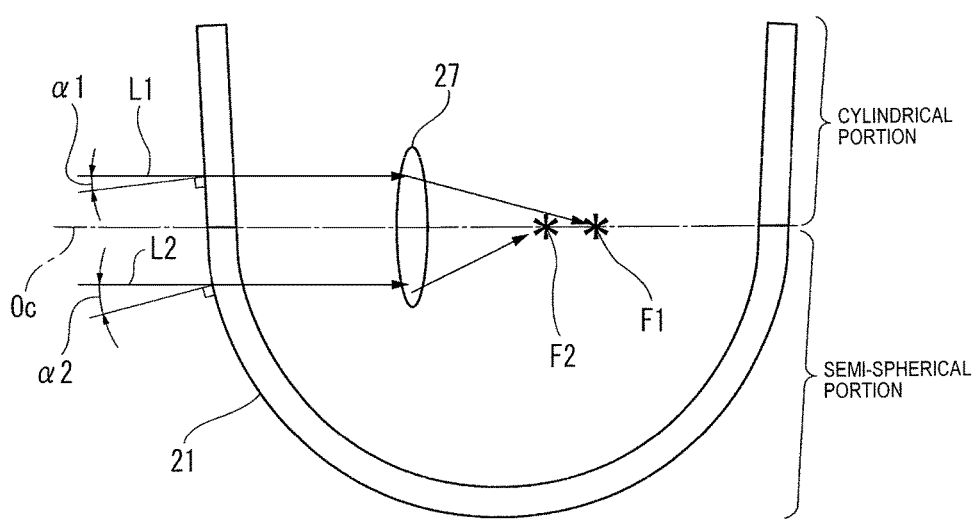
FIG. 24 is a schematic sectional view illustrating image formation in a case where images overlap with each other due to a difference in transmission angle between light rays transmitted through the dome cover, which travel above and below an optical axis of the surveillance camera, respectively.

FIG. 24 is a schematic sectional view illustrating image formation in a case where images overlap with each other due to a difference in transmission angle between light rays transmitted through dome cover 21, which travel above and below optical axis Oc of surveillance camera 11, respectively. An example, in which dome cover 21 includes a semi-spherical outer shell and a cylinder which is connected to a circumferential edge of an opening of the semi-spherical outer shell and has the same diameter as the opening, has been already described in the first exemplary embodiment, and thus is not described in detail (refer to FIG. 1). In a case where dome cover 21 as described above is used, there is a slight difference between transmission angle α1 of light ray L1 which is transmitted through a cylindrical portion of dome cover 21 while traveling above optical axis Oc (that is, above optical axis Oc in FIG. 24, the same applies hereafter) and transmission angle α2 of light ray L2 which is transmitted through a semi-spherical portion of dome cover 21 while traveling below optical axis Oc (that is, below optical axis Oc in FIG. 24, the same applies hereafter).

In a case where camera portion 25 is oriented nearly horizontally (that is, in a case where lens 27 is located in a position shown in FIG. 24), when light ray L1 and light ray L2 are incident on lens 27 and forms images via lens 27 of camera portion 25, there is a positional difference between focal points F1 and F2. Therefore, the formed images overlap each other and blurring occurs, which may cause a decrease in the image quality. For example, such a decrease in the image quality may become significant in a case where the positional difference between focal points F1 and F2 becomes large (for example, in a case where a zoom magnification is set to be high (telescopic)).

In addition, in surveillance camera 11 that includes dome cover 21 with a thickness of over 10 mm which is so called an explosion proof dome, regardless of whether the light rays are transmitted through the cylindrical portion of dome cover 21 (that is, a portion above optical axis Oc in FIG. 24) or through the semi-spherical portion of dome cover 21 (that is, a portion below optical axis Oc in FIG. 24), there is a slight difference in transmission angle between each position due to the influence of the thickness of dome cover 21. When there is a difference in transmission angle, images are formed with a positional difference between each focal point and overlap each other, and thus blurring occurs, which may cause a decrease in the image quality. For example, such a decrease in the image quality may become significant in a case where the positional difference between each focal point becomes large (for example, in a case where a zoom magnification is set to be high (telescopic)).

In this regard, in the third exemplary embodiment, an example of surveillance camera 11 will be described in which a front side of lens 27 of camera portion 25 described in FIG. 24 is covered with the pair of light shielding plates 43 described with reference to the first exemplary embodiment (or the pair of light shielding plates 93 and 95 described with reference to the second exemplary embodiment may be applied in the same manner).

Figure 25:
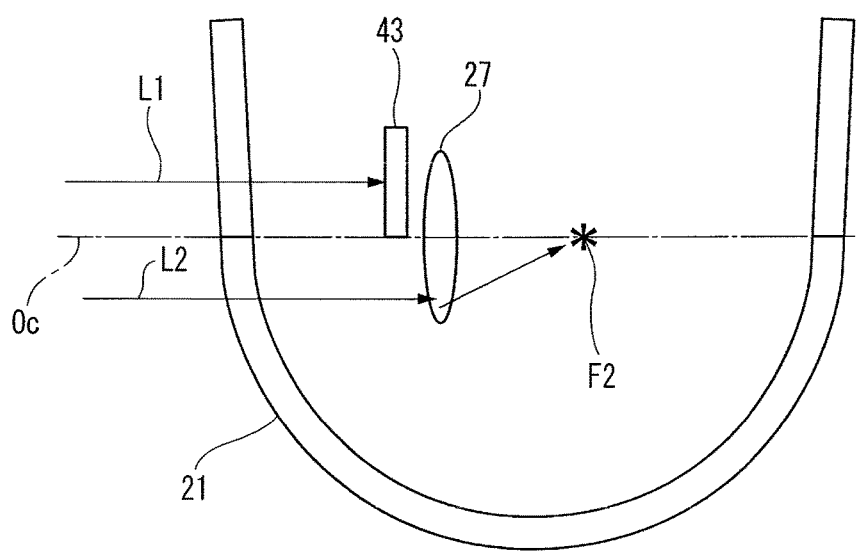
FIG. 25 is a schematic sectional view illustrating image formation in a case where the light ray above the optical axis of the surveillance camera is blocked.

FIG. 25 is a schematic sectional view illustrating image formation in a case where a light ray above optical axis Oc of surveillance camera 11 is blocked. For example, in surveillance camera 11 according to the third exemplary embodiment, the front side of lens 27 of camera portion 25 is covered with the pair of light shielding plates 43. Note that, here, image formation in a case where a light ray above optical axis Oc is blocked with one of the pair of light shielding plates 43 is illustrated for simplifying the description. However, image formation in a case where a light ray below optical axis Oc is blocked with one of the pair of light shielding plates 43 may also be illustrated. In surveillance camera 11 according to the third exemplary embodiment, lens 27 receives light, which is transmitted through dome cover 21 and is incident on lens 27, via light receiving hole 47 (refer to FIG. 2 or FIG. 16).

When a portion of the front side of lens 27 of camera portion 25 which is, for example, above optical axis Oc is covered with one of the pair of light shielding plates 43, light ray L1 above optical axis Oc can be blocked by light shielding plate 43. Accordingly, although the amount of light incident on lens 27 (that is, the amount of received light) is decreased, since only light ray L2 traveling below optical axis Oc is incident on lens 27, one of the images overlapping each other (which is formed at focal point F1) can be blocked, and thus it is possible to prevent a decrease in the image quality.

Similarly, when a portion of the front side of lens 27 of camera portion 25 which is, for example, below optical axis Oc is covered with one of the pair of light shielding plates 43, light ray L2 below optical axis Oc can be blocked by light shielding plate 43. Accordingly, although the amount of light incident on lens 27 (that is, the amount of received light) is decreased, since only light ray L1 traveling above optical axis Oc is incident on lens 27, one of the images overlapping each other (which is formed at focal point F2) can be blocked, and thus it is possible to prevent a decrease in the image quality.

In addition, in a case of surveillance camera 11 that includes the above-described explosion proof dome, even if light shielding plate 43 does not cover lens 27 over a range from a position above optical axis Oc to a central position, it is possible to decrease a positional difference between focal points (that is, the number of focal points at which images are formed with a positional difference is decreased) only by blocking incident light above light ray L1 that travels above optical axis Oc. Therefore, a portion of overlapping images can be blocked and it is possible to prevent a decrease in the image quality.

For example, in surveillance camera 11, the front side of lens 27 of camera portion 25 is covered with the pair of light shielding plates 43 from each side in a vertical direction of optical axis Oc. One light shielding plate 43 blocks incident light above light ray L1 that travels above optical axis Oc and other light shielding plate 43 blocks incident light below light ray L2 that travels below optical axis Oc.

In addition, in a case of surveillance camera 11 that includes the above-described explosion proof dome, even if light shielding plate 43 does not cover lens 27 over a range from a position below optical axis Oc to a central position, it is possible to decrease a positional difference between focal points (that is, the number of focal points at which images are formed with a positional difference is decreased) only by blocking incident light below light ray L2 that travels below optical axis Oc. Therefore, a portion of overlapping images can be blocked and it is possible to prevent a decrease in the image quality.

For example, in surveillance camera 11, the front side of lens 27 of camera portion 25 is covered with the pair of light shielding plates 43 from each side in a vertical direction of optical axis Oc. One light shielding plate 43 blocks incident light below light ray L2 that travels below optical axis Oc and other light shielding plate 43 blocks incident light above light ray L1 that travels above optical axis Oc.

Accordingly, in surveillance camera 11, only light rays in the vicinity of optical axis Oc are incident on lens 27. In a case where there is a difference in transmission angle between each position of dome cover 21 due to the influence of the thickness of dome cover 21 as in a case of the explosion proof dome, since the influence of a difference in transmission angle between blocked portions of light is suppressed (in other words, a difference in transmission angle is excluded). Therefore, a positional difference between focal points is decreased and a portion of overlapping images is blocked.

Figure 26:
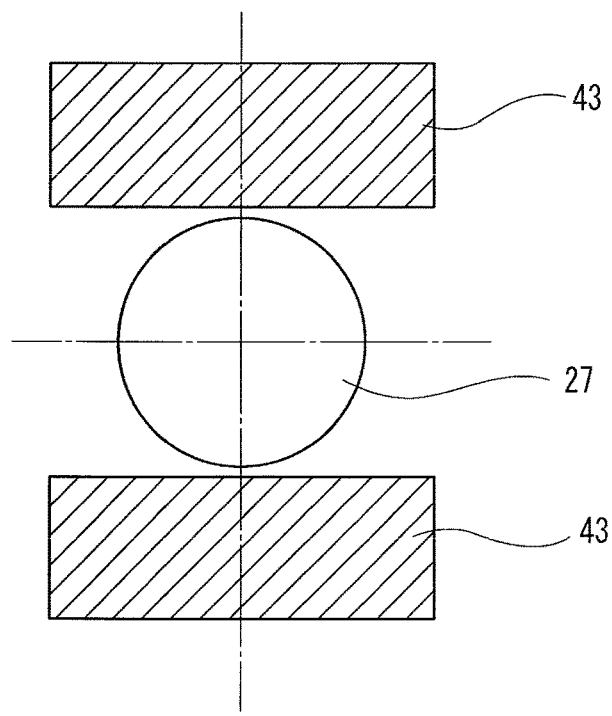
FIG. 26 is a schematic view illustrating a state where the pair of light shielding plates of the surveillance camera are open.
Figure 27:
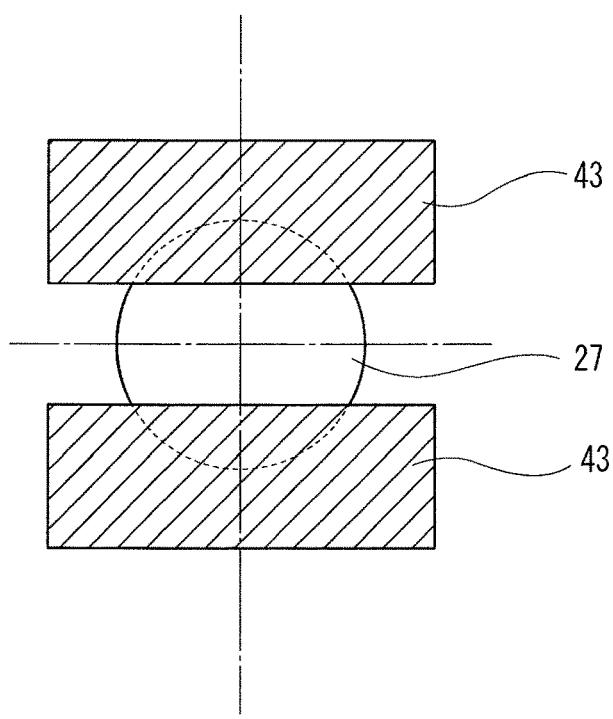
FIG. 27 is a schematic view illustrating a state where a lens is partially covered by the pair of light shielding plates of the surveillance camera.

FIG. 26 is a schematic view illustrating a state where the pair of light shielding plates 43 of surveillance camera 11 are open. FIG. 27 is a schematic view illustrating a state where lens 27 is partially covered by the pair of light shielding plates 43 of surveillance camera 11.

For example, surveillance camera 11 may be controlled such that light shielding plate 43 does not cover lens 27 as illustrated in FIG. 26 in a case where a zoom magnification is not set to be high (telescopic) and light shielding plate 43 covers only an upper portion and a lower portion of lens 27 as illustrated in FIG. 27 in a case where a zoom magnification is set to be high (telescopic).

Accordingly, in surveillance camera 11, even in a case where a zoom magnification is set to be high, it is possible to prevent a decrease in the image quality, and it is also possible to prevent the image from being dark since light in the vicinity of optical axis Oc is captured.

The exemplary embodiments have been described above with reference to the accompanying drawings. However, it is needless to say that the present disclosure is not limited to the exemplary embodiments described above. It is obvious for those skilled in the art that various modifications and corrections can be conceived within a scope described in claims, and it is needless to say that the modifications and corrections are also included in the technical scope of the disclosure.

What is claimed is:

1. An imaging apparatus comprising:
   a camera portion that includes a lens;
   a cover that includes a light receiving hole opening in front of the lens and covers the camera portion;
   a ring gear that is attached to the cover while surrounding the light receiving hole and being concentric with the light receiving hole, includes outer circumferential teeth, and is rotatable using the center of concentric circles formed by the ring gear and the light receiving hole as a rotation center; and
   a pair of light shielding plates that are attached to a cover outer surface, which is on an opposite side of the camera portion, with an optical axis interposed therebetween such that the pair of light shielding plates can approach and be separated from each other freely, each of the pair of light shielding plates including a rack which extends along a direction of the approach and separation, and opening and closing the light receiving hole with the racks meshing with opposite ends in a radial direction of the ring gear.

2. The imaging apparatus of claim 1,
   wherein the lens receives light, which is transmitted through a dome cover and is incident on the lens, via the light receiving hole.

3. The imaging apparatus of claim 1,
   wherein the outer circumferential teeth are formed as a bevel gear, and
   the rack is formed as an inclined rack which meshes with the bevel gear on one inner inclined surface of a V-groove, and in each of the pair of light shielding plates, a notch, which allows a movement of the bevel gear in a direction along the rotation center by releasing the meshing between the inclined rack and the bevel gear when the pair of light shielding plates are in a set position which is closer to the outside than a fully-open position is, is formed on the inclined rack.

4. The imaging apparatus of claim 3,
   wherein the cover is provided with a pair of assembly guides which respectively restrict movements in a separation direction of the pair of light shielding plates when the pair of light shielding plates are in the set position.

5. The imaging apparatus of claim 4, wherein a stopper is provided on a light shielding plate-closing side of each assembly guide of the cover, the stopper including an inclined surface that a contact end of the light shielding plate, which comes into contact with the assembly guide, can slide up, and coming into contact with the contact end which has passed over the inclined surface to inhibit the light shielding plate from moving toward the set position beyond the fully-open position.

6. The imaging apparatus of claim 1, wherein an opening and closing lever which swings to open or close one of the pair of light shielding plates is swingably supported by a tilt shaft, an input tooth portion extending in a swing direction is formed on the opening and closing lever, and the input tooth portion meshes with a worm fixed to a driving shaft of an opening and closing motor.

7. The imaging apparatus of claim 1, wherein the rack of each of the pair of light shielding plates includes notches that mesh with the outer circumferential teeth of the ring gear.

8. The imaging apparatus of claim 7, wherein the rack of each of the pair of light shielding plates is tangential to the ring gear, with the rack of a first one of the pair of light shielding plates being parallel to the rack of a second one of the pair of light shielding plates.

9. The imaging apparatus of claim 8, when the ring gear is rotated about the rotation center, the second one of the pair of light shielding plates moves in an opposite direction than the first one of the pair of light shielding plates with the rack of each of the pair of light shielding plates moving tangentially to the ring gear by the notches meshing with the outer circumferential teeth of the ring gear.

10. The imaging apparatus of claim 9, further comprising: a motor configured to rotate the ring gear about the rotation center.

11. The imaging apparatus of claim 10, wherein the motor comprises a lever that is fixed to the first one of the pair of light shielding plates for moving the first one of the pair of light shielding plates tangentially to the ring gear, for causing the ring gear to rotate about the rotation center and the second one of the pair of light shielding plates to move in the opposite direction.

12. The imaging apparatus of claim 11, wherein the pair of light shielding plates and the ring gear are moved and rotated by only the motor, with the second one of the pair of light shielding plates and the ring gear not being fixed to a driving mechanism.

13. An imaging apparatus, comprising:
a camera that includes a lens;
a cover that includes a light receiving hole in front of the lens of the camera;
a ring gear that surrounds the light receiving hole, includes outer circumferential teeth, and is rotatable around the light receiving hole;
a pair of light shielding plates that each include a rack, each rack including notches that mesh with the outer circumferential teeth of the ring gear, each rack being tangential to the ring gear and configured to move the pair of light shielding plates in opposite directions when the ring gear is rotated around the light receiving hole for one of exposing and covering the light receiving hole; and
a single motor fixed to one of the pair of light shielding plates for causing the ring gear to rotate around the light receiving hole and the pair of light shielding plates to move in the opposite directions.

* * * * *